(12) United States Patent
Kumazaki et al.

(10) Patent No.: US 7,065,097 B2
(45) Date of Patent: Jun. 20, 2006

(54) PROGRAM INFORMATION TRANSMISSION APPARATUS THAT TRANSITS PROGRAM INFORMATION AT A CONSTANT RATE THROUGH A CYCLE

(75) Inventors: Tsutomu Kumazaki, Kakamigahara (JP); Takashi Matsumoto, Nagoya (JP); Masaaki Yoshikawa, Tokyo-to (JP); Osamu Takeuchi, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1287 days.

(21) Appl. No.: 09/748,479

(22) Filed: Dec. 27, 2000

(65) Prior Publication Data

US 2001/0005374 A1 Jun. 28, 2001

(30) Foreign Application Priority Data

Dec. 27, 1999 (JP) ................................. 11-371083

(51) Int. Cl.
*H04L 12/54* (2006.01)

(52) U.S. Cl. ........................ 370/428; 370/429; 725/146

(58) Field of Classification Search ................ 370/428, 370/429, 472, 470, 474, 476
See application file for complete search history.

(56) References Cited

U.S. PATENT DOCUMENTS

| | | | | |
|---|---|---|---|---|
| 5,625,832 A | * | 4/1997 | Ohsawa et al. ............... 712/28 |
| 5,859,835 A | * | 1/1999 | Varma et al. ................ 370/229 |
| 5,907,556 A | * | 5/1999 | Hisanaga et al. ........... 370/468 |
| 5,944,792 A | * | 8/1999 | Yamato et al. .............. 709/219 |
| 6,157,948 A | * | 12/2000 | Inoue et al. ................. 709/219 |
| 6,310,921 B1 | * | 10/2001 | Yoshioka et al. ....... 375/240.26 |
| 6,438,751 B1 | * | 8/2002 | Voyticky et al. .............. 725/42 |
| 6,505,347 B1 | * | 1/2003 | Kaneko et al. ................ 725/39 |
| 6,567,409 B1 | * | 5/2003 | Tozaki et al. .......... 370/395.64 |
| 6,701,372 B1 | * | 3/2004 | Yano et al. .................. 709/232 |
| 6,782,553 B1 | * | 8/2004 | Ogawa et al. ............... 725/146 |

FOREIGN PATENT DOCUMENTS

JP 2000278228 10/2000

* cited by examiner

*Primary Examiner*—Ricky Q. Ngo
*Assistant Examiner*—Andrew C. Lee

(57) ABSTRACT

A data reading control unit select packets to be transmitted so that the number of packets that are transmitted per unit time does not exceed the number of packets that can be transmitted per unit time. The data reading control unit performs this packet selection according to the transmission amount per unit time calculated by a transmission amount calculation unit, the priority information in a priority storing unit, and the transmission queue information in a transmission queue information storing unit. The data reading control unit 109 reads pointers to the selected packets from a cycle transmission queue buffer, reads TS packets from a TS packet buffer according to the read pointers, and outputs the read TS packets to a transmission unit.

18 Claims, 25 Drawing Sheets

FIG. 4A

PROGRAM INFORMATION A

CHANNEL 3
CHANNEL 2
CHANNEL 1

| START TIME | BROADCAST LENGTH | SIZE | PROGRAM DESCRIPTION |
|---|---|---|---|
| 1999/10/14 11:00 | 00:30 | 200byte | MORNING NEWS |
| 1999/10/14 11:30 | 00:45 | 100byte | AFTERNOON NEWS |
| 1999/10/14 12:15 | 01:00 | 450byte | AFTERNOON TV DRAMA |
| ⋮ | | | |
| 1999/10/16 23:00 | 00:50 | 200byte | MIDNIGHT NEWS |

FIG. 4B

PROGRAM INFORMATION B

CHANNEL 100
CHANNEL 3
CHANNEL 2
CHANNEL 1

| START TIME | BROADCAST LENGTH | SIZE | PROGRAM DESCRIPTION |
|---|---|---|---|
| 1999/10/14 11:00 | 00:30 | 250byte | TV DRAMA |
| 1999/10/14 11:30 | 00:45 | 200byte | VARIETY SHOW |
| 1999/10/14 12:15 | 01:00 | 500byte | WORLD NEWS |
| ⋮ | | | |
| 1999/10/16 23:00 | 00:50 | 300byte | PROFESSIONAL BASEBALL NEWS |

FIG. 4C

PROGRAM INFORMATION C

CHANNEL 3
CHANNEL 2
CHANNEL 1

| START TIME | BROADCAST LENGTH | SIZE | PROGRAM DESCRIPTION |
|---|---|---|---|
| 1999/10/14 11:00 | 00:30 | 200byte | MORNING NEWS |
| 1999/10/14 11:30 | 00:45 | 100byte | AFTERNOON NEWS |
| 1999/10/14 12:15 | 01:00 | 450byte | AFTERNOON TV DRAMA |
| ⋮ | | | |
| 1994/11/13 23:00 | 00:50 | 190byte | MIDNIGHT NEWS |

FIG. 5

| TYPE OF PROGRAM INFORMATION | CYCLE LENGTH |
|---|---|
| PROGRAM INFORMATION A (TableA) | 3 SECONDS |
| PROGRAM INFORMATION B (TableB) | 10 SECONDS |
| PROGRAM INFORMATION C (TableC) | 10 SECONDS |

FIG. 7A

| CYCLE=THREE SECONDS | | | |
|---|---|---|---|
| A1[1] | A1[2] | A1[3] | A1[4] |
| A2[1] | A2[2] | A2[3] | A2[4] |
| A3[1] | A3[2] | A3[3] | A3[4] |

FIG. 7B

| CYCLE=TEN SECONDS | | | | | | | | | | |
|---|---|---|---|---|---|---|---|---|---|---|
| B1[1] | B1[2] | B1[3] | B1[4] | | | | | | | |
| B2[1] | B2[2] | B2[3] | B2[4] | | | | | | | |
| · | · | · | · | | | | | | | |
| B100[1] | B100[2] | B100[3] | B100[4] | | | | | | | |
| C1[1] | C1[2] | · | C1[21] | C1[22] | · | C1[39] | C1[40] | · | C1[61] | C1[62] | · | C1[69] |
| C2[1] | C2[2] | · | C2[20] | C2[21] | · | C2[37] | C2[38] | · | C2[59] | | | |
| C3[1] | C3[2] | · | C3[19] | C3[20] | · | C3[39] | C3[40] | · | C3[61] | C3[70] | · | C3[76] |

FIG. 9

| TRANSMISSION QUEUE 1  TableA | |
|---|---|
| SubTable | Section1 |
| A1 | 4 |
| A2 | 4 |
| A3 | 4 |

| TRANSMISSION QUEUE 2  TableB | |
|---|---|
| SubTable | Section1 |
| B1 | 4 |
| B2 | 4 |
| . | . |
| . | . |
| B100 | 4 |

| TRANSMISSION QUEUE 3  TableC | | | | |
|---|---|---|---|---|
| SubTable | Section1 | Section2 | Section3 | Section4 |
| C1 | 21 | 18 | 22 | 8 |
| C2 | 20 | 17 | 22 | |
| C3 | 19 | 20 | 22 | 15 |

FIG. 10

| Table | PRIORITY |
|---|---|
| TableA | 1 |
| TableB | 2 |
| TableC | 3 |

FIG. 11

| Table | CYCLE | UNIT TIME PERIOD | NUMBER OF TRANSMISSION PERIODS | NUMBER OF PACKETS | NUMBER OF PACKETS PER UNIT TIME PERIOD | EMi | EL |
|---|---|---|---|---|---|---|---|
| TableA | THREE SECONDS | 100ms | 30回 | 12 | 0.4 | 1 | |
| TableB | TEN SECONDS | 100ms | 100回 | 400 | 4 | 5 | 9 |
| TableC | TEN SECONDS | 100ms | 100回 | 204 | 2.04 | 3 | |

FIG. 12

| CRITERION A-1 | The number of packets that are transmitted per unit time period does not exceed the standard total transmission amount EL. |
|---|---|
| CRITERION B-1 | The continuity of packets of a section is not interrupted by packets of another section during transmission |
| CRITERION B-2 | Packets of tables given higher priorities are transmitted first. |
| CRITERION B-3 | When the amount of transmitted packets of a current table reaches a corresponding standard table transmission amount Emi, the current table is switched to the next table. |

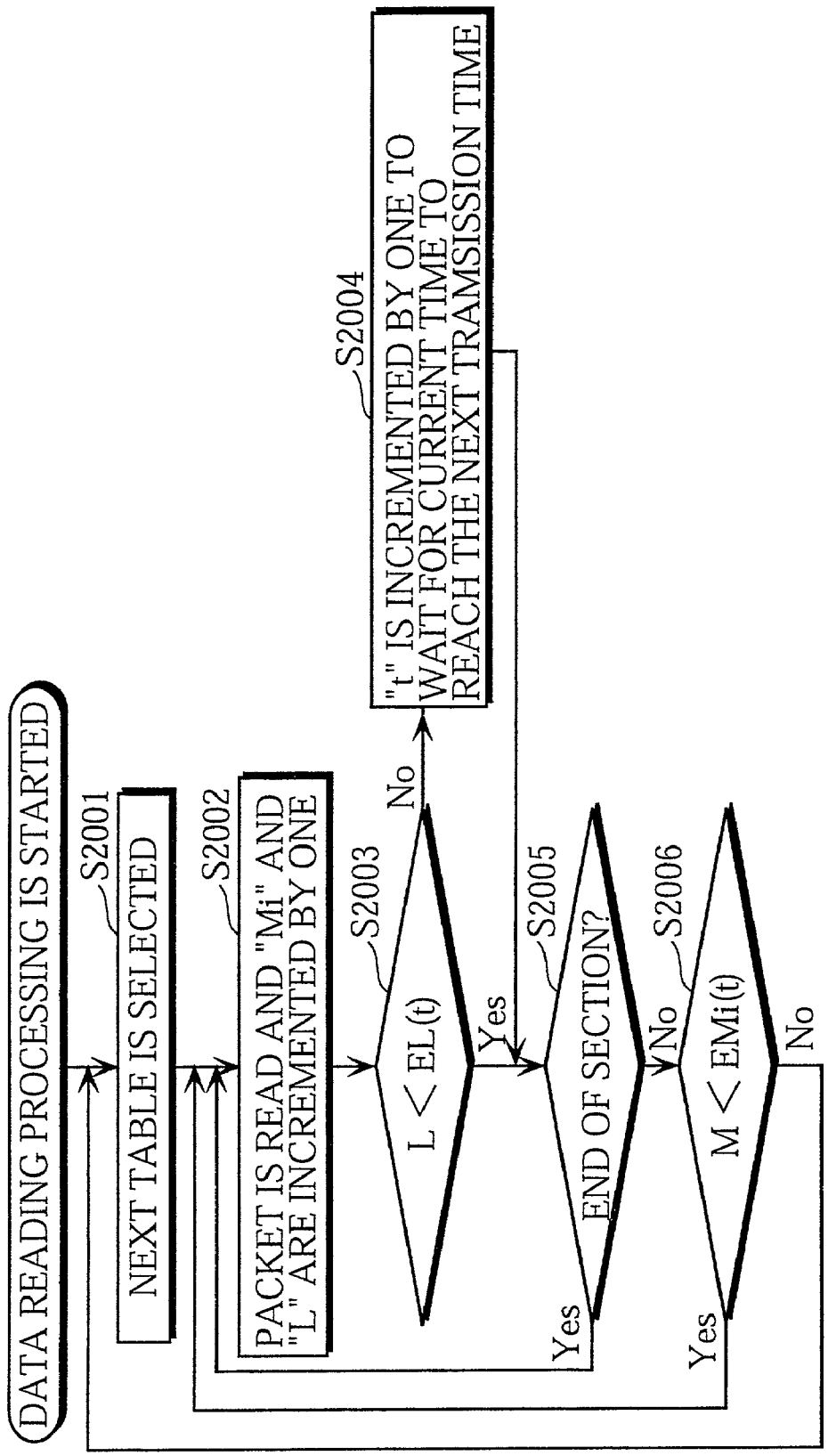

FIG. 14A

| NUMBER OF TRANSMISSIONS t | no.1 | no.2 | no.3 | no.4 | no.5 | no.6 | no.7 | no.8 | no.9 |
|---|---|---|---|---|---|---|---|---|---|
| 1 | A1 | A1 | A1 | A1 | B1 | B1 | B1 | B1 | B2 |
| 2 | B2 | B2 | B2 | B3 | B3 | B3 | B3 | C1 | C1 |
| 3 | C1 | C1 | C1 | C1 | C1 | C1 | C1 | C1 | C1 |
| 4 | C1 | C1 | C1 | C1 | C1 | C1 | C1 | C1 | C1 |
| 5 | C1 | A2 | A2 | A2 | A2 | B4 | B4 | B4 | B4 |
| 6 | B5 | B5 | B5 | B5 | B6 | B6 | B6 | B6 | B7 |
| 7 | B7 | B7 | B7 | B8 | B8 | B8 | B8 | B9 | B9 |
| 8 | B9 | B9 | B10 | B10 | B10 | B10 | C2 | C2 | C2 |
|   |    |    |    |    |    |    |    |    |    |

FIG. 14B

| NUMBER OF TRANSMISSIONS t | TableA | | TableB | | TableC | | |
|---|---|---|---|---|---|---|---|
|   | $EM1(t)$ | M1 | $EM2(t)$ | M2 | $EM3(t)$ | M3 | $EL(t)$ |
| 1 | 1 | 4 | 5 | 5 | 3 | 0 | 9 |
| 2 | 2 | 4 | 10 | 12 | 6 | 2 | 18 |
| 3 | 3 | 4 | 15 | 12 | 9 | 11 | 27 |
| 4 | 4 | 4 | 20 | 12 | 12 | 20 | 36 |
| 5 | 5 | 8 | 25 | 16 | 15 | 21 | 45 |
| 6 | 6 | 8 | 30 | 25 | 18 | 21 | 54 |
| 7 | 7 | 8 | 35 | 34 | 21 | 21 | 63 |
| 8 | 8 | 8 | 40 | 40 | 24 | 24 | 72 |
|   |   |   |   |   |   |   |   |

FIG. 15

| Table | CYCLE | UNIT TIME PERIOD | NUMBER OF TRANSMISSION PERIODS | NUMBER OF PACKETS PER UNIT TIME PERIOD | $ESi(t)$ | $EMi(t)$ | $ELt(t)$ |
|---|---|---|---|---|---|---|---|
| TableA | THREE SECONDS | 100ms | 12 | 0.4 | $0.5 \times t$ | $INT(ES1(t)+0.9)$ | $ME1(t)$ $+EM2(t)$ $+EM3(t)$ |
| TableB | TEN SECONDS | 100ms | 400 | 4 | $4.1 \times t$ | $INT(ES2(t)+0.9)$ | |
| TableC | TEN SECONDS | 100ms | 204 | 2.04 | $2.1 \times t$ | $INT(ES3(t)+0.9)$ | |

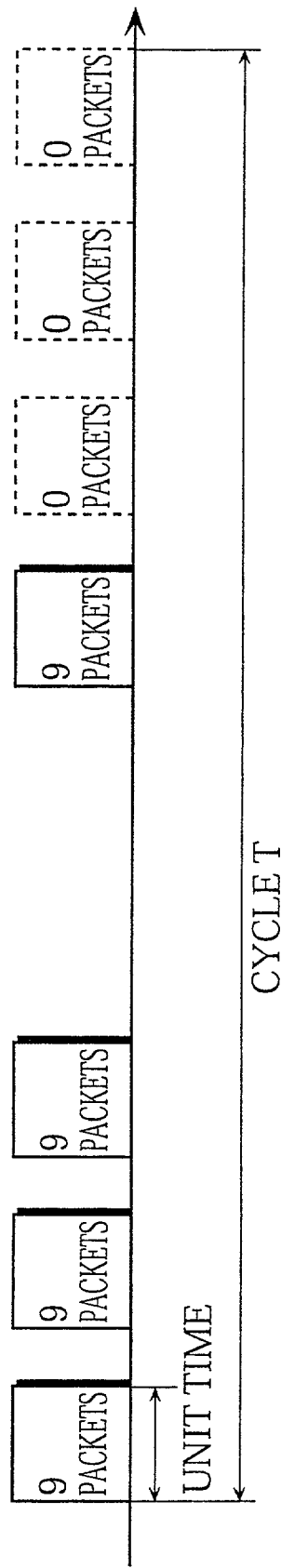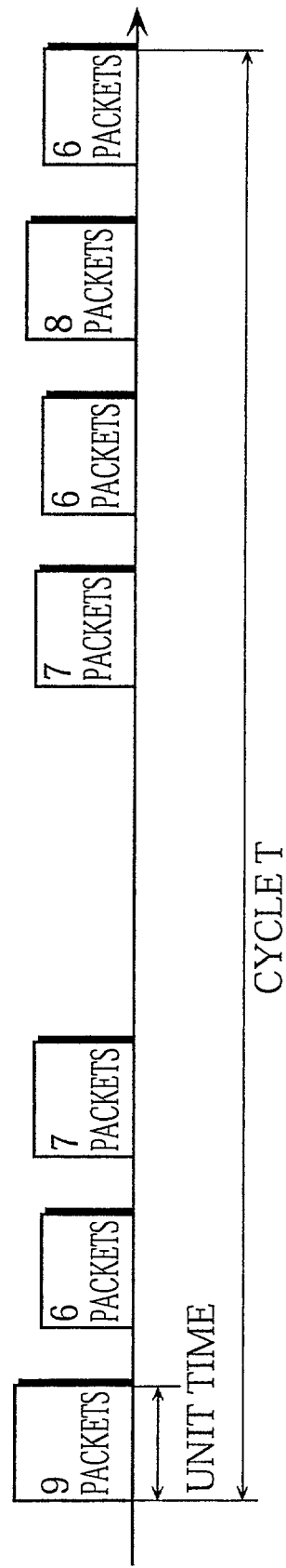

FIG. 17A

| NUMBER OF TRANSMISSIONS | no.1 | no.2 | no.3 | no.4 | no.5 | no.6 | no.7 | no.8 | no.9 |
|---|---|---|---|---|---|---|---|---|---|
| 1 | A1 | A1 | A1 | A1 | B1 | B1 | B1 | B1 | B2 |
| 2 | B2 | B2 | B2 | B3 | B3 | B3 | | | |
| 3 | B3 | B4 | B4 | B4 | B4 | B4 | B4 | | |
| 4 | C1 | C1 | C1 | C1 | C1 | C1 | C1 | | |
| 5 | C1 | C1 | C1 | C1 | C1 | C1 | | | |
| 6 | C1 | C1 | C1 | C1 | C1 | C1 | | | |
| 7 | B5 | B5 | B5 | B5 | B6 | B6 | B6 | | |
| 8 | B6 | B7 | B7 | B7 | B7 | B8 | | | |

FIG. 17B

TableA

| NUMBER OF TRANSMISSIONS | ES1(t) | EM1(t) | M1 |
|---|---|---|---|
| 1 | 0.5 | 1 | 4 |
| 2 | 1.0 | 1 | 4 |
| 3 | 1.5 | 2 | 4 |
| 4 | 2.0 | 2 | 4 |
| 5 | 2.5 | 3 | 4 |
| 6 | 3.0 | 3 | 4 |
| 7 | 3.5 | 4 | 4 |
| 8 | 4.0 | 4 | 4 |

TableB

| ES2(t) | EM2(t) | M2 |
|---|---|---|
| 4.1 | 5 | 5 |
| 8.2 | 9 | 11 |
| 12.3 | 13 | 16 |
| 16.4 | 17 | 16 |
| 20.5 | 21 | 16 |
| 24.6 | 25 | 16 |
| 28.7 | 29 | 23 |
| 32.8 | 33 | 29 |

TableC

| ES3(t) | EM3(t) | M3 | EL(t) |
|---|---|---|---|
| 2.1 | 3 | 0 | 9 |
| 4.2 | 5 | 0 | 15 |
| 6.3 | 7 | 2 | 22 |
| 8.4 | 9 | 8 | 28 |
| 10.5 | 11 | 15 | 35 |
| 12.6 | 13 | 21 | 41 |
| 14.7 | 15 | 21 | 48 |
| 16.8 | 17 | 21 | 54 |

FIG. 19A

| CYCLE=THREE SECONDS | | | |
|---|---|---|---|
| A1[1] | A1[2] | A1[3] | A1[4] |
| A2[1] | A2[2] | A2[3] | A2[4] |
| A3[1] | A3[2] | A3[3] | A3[4] |

FIG. 19B

| CYCLE=TEN SECONDS | | | | | | | | | | | |
|---|---|---|---|---|---|---|---|---|---|---|---|
| B1[1] | B1[2] | B1[3] | B1[4] | | | | | | | | |
| B2[1] | B2[2] | B2[3] | B2[4] | | | | | | | | |
| . | . | . | . | | | | | | | | |
| . | . | . | . | | | | | | | | |
| B100[1] | B100[2] | B100[3] | B100[4] | | | | | | | | |
| C1[1] | C1[2] | . | C1[21] | C1[22] | . | C1[39] | C1[40] | . | C1[61] | C1[62] | . | C1[69] |
| C2[1] | C2[2] | . | C2[20] | C2[21] | . | C2[37] | C2[38] | . | C2[59] | | |
| C3[1] | C3[2] | . | C3[19] | C3[20] | . | C3[39] | C3[40] | . | C3[61] | C3[70] | . | C3[76] |

FIG. 19C

| IMMEDIATE | | | |
|---|---|---|---|
| D1[1] | D1[2] | D1[3] | D1[4] |
| D2[1] | D2[2] | D2[3] | D2[4] |
| D3[1] | D3[2] | D3[3] | D3[4] |

FIG. 21

| TRANSMISSION QUEUE 1 TableA | |
|---|---|
| SubTable | Section1 |
| A1 | 4 |
| A2 | 4 |
| A3 | 4 |

| TRANSMISSION QUEUE 2 TableB | |
|---|---|
| SubTable | Section1 |
| B1 | 4 |
| B2 | 4 |
| ... | ... |
| B100 | 4 |

| TRANSMISSION QUEUE 3 TableC | | | | |
|---|---|---|---|---|
| SubTable | Section1 | Section2 | Section3 | Section4 |
| C1 | 21 | 18 | 22 | 8 |
| C2 | 20 | 17 | 22 | |
| C3 | 19 | 20 | 22 | 15 |

| IMMEDIATE TRANSMISSION QUEUE BUFFER TableD | |
|---|---|
| SubTable | Section1 |
| D1 | 4 |
| D2 | 4 |
| D3 | 4 |

FIG. 23A

| NUMBER OF TRANSMISSIONS t | no.1 | no.2 | no.3 | no.4 | no.5 | no.6 | no.7 | no.8 | no.9 | no.10 | no.11 | no.12 | no.13 | no.14 | no.15 |
|---|---|---|---|---|---|---|---|---|---|---|---|---|---|---|---|
| 1 | A1 | A1 | A1 | A1 | B1 | B1 | B1 | B1 | B2 | | | | | | |
| 2 | B2 | B2 | B2 | D1 | D1 | D | D1 | D1 | D2 | D2 | D2 | D3 | D3 | D3 | D3 |
| 3 | | | | | | | B3 | B3 | B3 | | | | | | |
| 4 | | | | | | | | | | | | | | | |

FIG. 23B

| | TableA | | TableB | | TableC | | | TableD | |
|---|---|---|---|---|---|---|---|---|---|
| NUMBER OF TRANSMISSIONS t | EM1(t) | M1 | EM2(t) | M2 | EM3(t) | M3 | M4 | L | EL(t) |
| 1 | 1 | 4 | 5 | 5 | 3 | 0 | 0 | 9 | 9 |
| 2 | 2 | 4 | 10 | 8 | 6 | 0 | 12 | 24 | 18 |
| 3 | 3 | 4 | 15 | 11 | 9 | 0 | 12 | 27 | 27 |
| 4 | | | | | | | | | |

PROGRAM INFORMATION TRANSMISSION APPARATUS THAT TRANSITS PROGRAM INFORMATION AT A CONSTANT RATE THROUGH A CYCLE

BACKGROUND OF THE INVENTION

1. Field of the Invention

The present invention relates to a program information transmission apparatus that transmits program information in a broadcasting system, such as a digital broadcasting system.

2. Description of the Related Art

It is planned to transmit program information as one service to viewers in a digital broadcasting system. The program information is similar to a newspaper television guide and gives information concerning broadcast programs. For instance, the program information shows the performers and summaries of the broadcast programs. The program information is repeatedly transmitted with a specific cycle to allow viewers to obtain the program information at any necessary time and to determine which broadcast program to watch by referring to the program information.

A conventional program information transmission apparatus, however, transmits program information without adjusting the transmission amount of the program information unless the bandwidth assigned to the program information is fully used. As a result, there may be cases where the program information is intensively transmitted at specific time.

FIG. 1 is an example timing chart showing program information transmission. In this drawing, long-term program information A is repeatedly transmitted with a cycle of $T_1$ and short-term program information B is repeatedly transmitted with a cycle of $T_2$. Also, all of the program information A is transmitted within a time period of $\Delta t1$ and all of the program information B is transmitted within a time period of $\Delta t2$. As a result, as shown in this drawing, the program information is intensively transmitted at specific time.

The processing by a reception apparatus that receives program information is next described. After receiving program information, the reception apparatus temporarily stores the received program information in a reception buffer, performs necessary processing on the program information in the reception buffer, and stores the processed program information in a memory whose capacity is larger than that of the reception buffer. If the program information is intensively transmitted at specific time as described above, there may be cases where the stated processing by the reception apparatus does not catch up with the program information transmission and an overflow will occur in the reception buffer.

SUMMARY OF THE INVENTION

The object of the present invention is therefore to provide a program information transmission apparatus that transmits program information so that no overflows will occur in reception buffers of reception apparatuses and the reception apparatuses will receive the program information without problems.

The stated object is achieved by a program information transmission apparatus that repeatedly transmits program information with a predetermined cycle, including: a storing unit operable to store information showing a transmission amount per unit time, the unit time being shorter than the cycle; a fetching unit operable to fetch the program information in parts so that each fetched part of the program information has a size within the transmission amount per unit time; and a transmission unit operable to sequentially transmit each fetched part of the program information.

With this construction, the program information transmission apparatus transmits the program information at a rate not exceeding the transmission amount per unit time. This avoids a situation where the program information is intensively transmitted at specific time. Therefore, by appropriately setting the transmission amount per unit time, no overflows will occur in reception buffers of reception apparatuses.

Here, the information in the storing unit may show, as the transmission amount per unit time, a maximum number of packets that should be transmitted per unit time, and the fetching unit may include: a packet generating unit operable to generate a plurality of packets of a fixed length from program information sets, each of which includes a part of the program information; a holding unit operable to hold the plurality of packets so that packets belonging to different program information sets are held in different queues; and a packet fetching unit operable to fetch the plurality of packets from the queues in a predetermined order so that a number of packets fetched per unit time does not exceed the maximum number.

With this construction, the program information transmission apparatus transmits packets per unit time so that the number of packets transmitted per unit time does not exceed a predetermined number of packets that can be transmitted per unit time. This avoids a situation where packets are intensively transmitted at specific time and so no overflows will occur in reception buffers of reception apparatuses.

Here, packets generated from one program information set may be divided into at least one section, and the packet fetching unit may be controlled to fetch all packets in a current section before fetching packets in another section.

With this construction, the continuity of packets belonging to a section is not interrupted by packets belonging to another section during transmission. This allows reception apparatuses to correctly construct program information from received packets.

Here, the program information transmission apparatus may further include: a calculation unit operable to recalculate the maximum number, each time at least one program information set is updated or is newly registered, where the calculation unit includes: a first calculation unit operable to calculate a maximum number for each program information set from a data amount of the program information set and the cycle, each maximum number calculated for one program information set being a maximum number of packets of the program information set that should be transmitted per unit time; and a second calculation unit operable to calculate a total of the maximum numbers calculated by the first calculation unit, where the information in the storing unit is overwritten with the total calculated by the second calculation unit.

With this construction, the program information transmission apparatus calculates the maximum number so that the transmission amount per unit time becomes almost constant through the cycle.

Here, each program information set may be assigned a priority, and the packet fetching unit may fetch the plurality of packets from the queues according to the priorities assigned to the program information sets.

With this construction, if priorities are assigned to program information sets, the program information transmission apparatus transmits program information sets assigned higher priorities first without interrupting the continuity of packets in each section. This allows reception apparatuses to correctly receive program information sets assigned higher priorities first.

Here, the storing unit may also store each maximum number calculated by the first calculation unit, and the packet fetching unit may include: a cumulative calculation unit operable to, after the packet fetching unit fetches the last packet of a current section in an "n"th transmission period, calculate a cumulative number for a program information set including the current section by multiplying the maximum number for the program information set by "n", each transmission period being a period within the cycle and having a length of the unit time, the cumulative number being a number of packets of the program information set that should be transmitted by an end of the "n"th transmission period; and a selecting unit operable to, if a number of hitherto fetched packets of the program information set is at least equal to the cumulative number, select another program information set assigned a next higher priority as a program information set whose packets are to be fetched.

With this construction, the program information transmission apparatus transmits each program information set in parts using a plurality of transmission periods in the cycle. This allows a reception apparatus, which is capable to process packets of different program information sets in parallel, to efficiently process program information. Therefore, overflows in reception buffers of reception apparatuses can be avoided with more reliability.

Here, the program information transmission apparatus may further include: an input receiving unit operable to receive an input of immediate program information that should be urgently transmitted; a prohibiting unit operable to prohibit, if immediate program information is inputted, the packet fetching unit from fetching packets; a second packet generating unit operable to generate a plurality of packets of a fixed length from the inputted immediate program information; a transmission control unit operable to control the transmission unit to sequentially transmit all of the packets generated by the second packet generating unit; and a prohibition ending unit operable to instruct, after all of the packets generated by the second packet generating unit are transmitted, the prohibiting unit to end the prohibition operation.

With this construction, the program information transmission apparatus gives higher priority to the transmission of immediate program information. This allows reception apparatuses to obtain the immediate program information as soon as possible.

Here, the program information transmission apparatus may further include: an input receiving unit operable to receive an input of immediate program information that should be urgently transmitted; a prohibiting unit operable to prohibit, if immediate program information is inputted, the packet fetching unit from fetching packets; a second packet generating unit operable to generate a plurality of packets of a fixed length from the inputted immediate program information; a transmission control unit operable to control the transmission unit to sequentially transmit all of the packets generated by the second packet generating unit; and a prohibition ending unit operable to perform, after all of the packets generated by the second packet generating unit are transmitted, packet transmission adjustment for a number of transmitted packets exceeding the maximum number of packets that should be transmitted per unit time, before instructing the prohibiting unit to end the prohibition operation.

With this construction, the program information transmission apparatus refrains from transmitting packets of usual program information for a period corresponding to the number of transmitted packets that exceeds the maximum number due to the transmission of immediate program information. This prevents overflows in reception buffers of reception apparatuses.

Here, the prohibiting unit may wait for all packets of a section, which includes a packet fetched immediately before the immediate program information was inputted, to be fetched before starting the prohibition operation, and the prohibition ending unit may wait for a number of packets, whose transmission is refrained after all packets generated by the second packet generating unit are transmitted, reaches a number of transmitted packets exceeding the maximum number of packets that should be transmitted per unit time, before instructing the prohibiting unit to end the prohibition operation.

With this construction, if not all of packets in a current section have been transmitted, the program information transmission apparatus transmits the remaining packets in the current section prior to the transmission of immediate program information. Therefore, the continuity of packets belonging to the current section is not interrupted by packets belonging to the immediate program information during transmission. This allows reception apparatuses to correctly construct program information from received packets.

The stated object is also achieved by a program information transmission apparatus that repeatedly transmits program information with a predetermined cycle, including: a storing unit operable to store information showing a maximum number for each transmission period that is a period within the cycle and has a length of a unit time shorter than the cycle, each maximum number for one transmission period being a number of packets that should be transmitted in the transmission period; a packet generating unit operable to generate a plurality of packets of a fixed length from program information sets, each of which includes a part of the program information; a holding unit operable to hold the plurality of packets so that packets belonging to different program information sets are held in different queues; a fetching unit operable to fetch the plurality of packets from the queues in a predetermined order so that a number of packets fetched in each transmission period does not exceed the maximum number for the transmission period; a transmission unit operable to sequentially transmit each fetched packet; a calculation unit operable to recalculate each maximum number, each time at least one program information set is updated or is newly registered, where the calculation unit includes: a first calculation unit operable to divide a data amount of each program information set by a number of transmission periods within the cycle and set a division result obtained for each program information set as an average number for the program information set without rounding up or discarding a fractional portion of the division result, each average number for one program information set being a number of packets of the program information set that should be transmitted per unit time; a second calculation unit operable to calculate, for each program information set, a cumulative number of packets of the program information set that should be transmitted by an end of an "n"th transmission period by multiplying the average number for the program information set by "n"; a third calculation unit operable to total the cumulative numbers calculated by the second calculation unit; and a fourth calculation unit operable to calculate the maximum number for the "n"th transmission period from the total calculated by the third calculation unit, where the information in the storing unit is overwritten with the maximum number calculated by the fourth calculation unit.

With this construction, the program information transmission apparatus calculates a maximum number for each transmission period from each average number obtained by the first calculation unit without rounding up the fraction portion of each average number. This avoids a situation where the transmission of packets is concentrated in certain transmission periods in the cycle.

Here, the second calculation unit may add a predetermined positive value that does not exceed one to each average number, set each addition result as a new average number, multiply each new average number by "n", obtain an integer by rounding up each multiplication result, and set each integer as one cumulative number.

With this construction, the program information transmission apparatus adds a value below one to each average number calculated by the first calculation unit and calculates a maximum number for each transmission period from each addition result. This avoids a situation where all of program information cannot be transmitted within the cycle due to the delay in processing by the program information transmission apparatus, a multiplexing apparatus, and other peripheral apparatuses because of some circumstances.

As described above, with the present invention, program information is correctly and promptly provided to viewers. Therefore, the viewers can select which broadcast program, out of various broadcast programs, to watch by referring to the program information. As a result, the present invention is of great practical use for digital broadcasting.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 4A–4C show example program information sets;

FIG. 5 shows example cycle lengths of the program information sets;

FIGS. 7A and 7B show a state where TS packets are stored in a TS packet buffer;

FIG. 9 shows an example of transmission queue information;

FIG. 10 shows an example of priority information;

FIG. 11 shows examples of standard transmission amounts calculated by a transmission amount calculation unit;

FIG. 12 shows criteria concerning the transmission order and the transmission amount per unit time;

FIG. 13 is a flowchart showing the operation procedure of a data reading control unit;

FIG. 14A shows a process where packets are read;

FIG. 14B shows assumed transmission amounts (EM1(t), EM2(t), EM3(t), and EL(t)) with actual transmission amounts (M1, M2, and M3);

FIG. 15 shows an example state where transmission amounts are calculated in the second embodiment;

FIG. 16A shows the transmission amount in each transmission period in the first embodiment;

FIG. 16B shows the transmission amount in each transmission period in the second embodiment;

FIG. 17A shows the process where packets are read;

FIG. 17B shows amended average numbers of packets (ES1(t), ES2(t), ES3(t)), assumed transmission amounts (EM1(t), EM2(t), EM3(t), and EL(t)), and actual transmission amounts (M1, M2, and M3);

FIGS. 19A–19C show a state where TS packets are stored in a TS packet buffer;

FIG. 21 shows an example of transmission queue information;

FIG. 23A shows the process where packets are read; and

FIG. 23B shows assumed transmission amounts (EM1(t), EM2(t), EM3(t), and EL(t)) with actual transmission amounts (M1, M2, M3, M4, and L).

DESCRIPTION OF THE PREFERRED EMBODIMENTS

Embodiments of the present invention are described below with reference to the drawings.

First Embodiment

The first embodiment relates to a program information transmission apparatus that transmits program information at a constant rate using a plurality of transmission periods in a cycle.

(Position of Program Information Transmission Apparatus within Broadcasting System)

Figure 1:
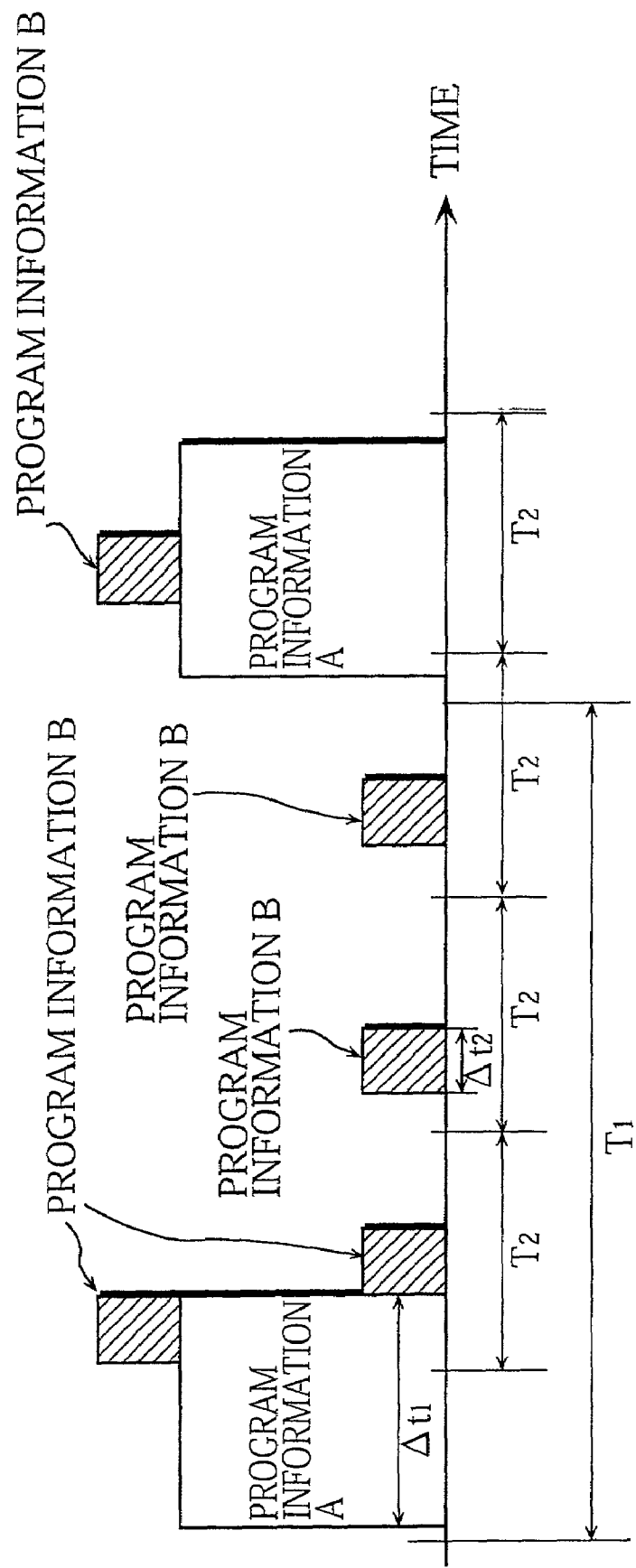
FIG. 1 is an example timing chart showing program information transmission based on a conventional technique.
Figure 2:
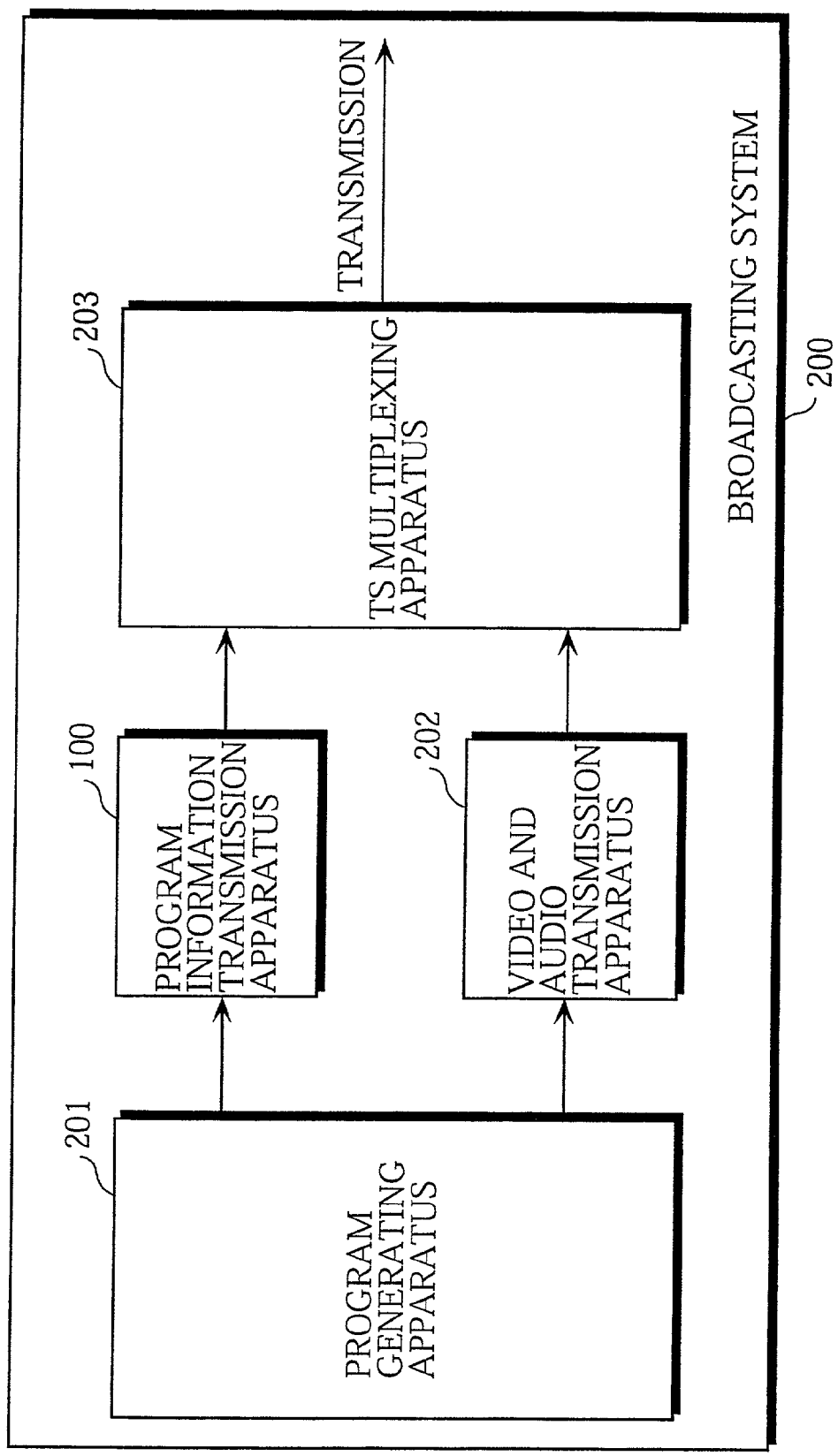
FIG. 2 shows the position of a program information transmission apparatus of the first embodiment within the whole of a broadcasting system.

FIG. 2 shows the position of a program information transmission apparatus 100 of the first embodiment within the whole of a broadcasting system 200. The broadcasting system 200 includes a program generating apparatus 201, the program information transmission apparatus 100, a video and audio transmission apparatus 202, and a TS multiplexing apparatus 203.

The program generating apparatus 201 generates video and audio data of broadcast programs and program information for the broadcast programs.

The program information transmission apparatus 100 converts the program information into transport stream packets (hereinafter referred to as the "TS packets"), adjusts the transmission amount and transmission order of the TS packets, and transmits the TS packets to the TS multiplexing apparatus 203.

The video and audio transmission apparatus 202 converts the video and audio data into TS packets and transmits the TS packets to the TS multiplexing apparatus 203.

The TS multiplexing apparatus 203 multiplexes the TS packets of the program information with the TS packets of the video and audio data.

(Construction of Program Information Transmission Apparatus)

Figure 3:
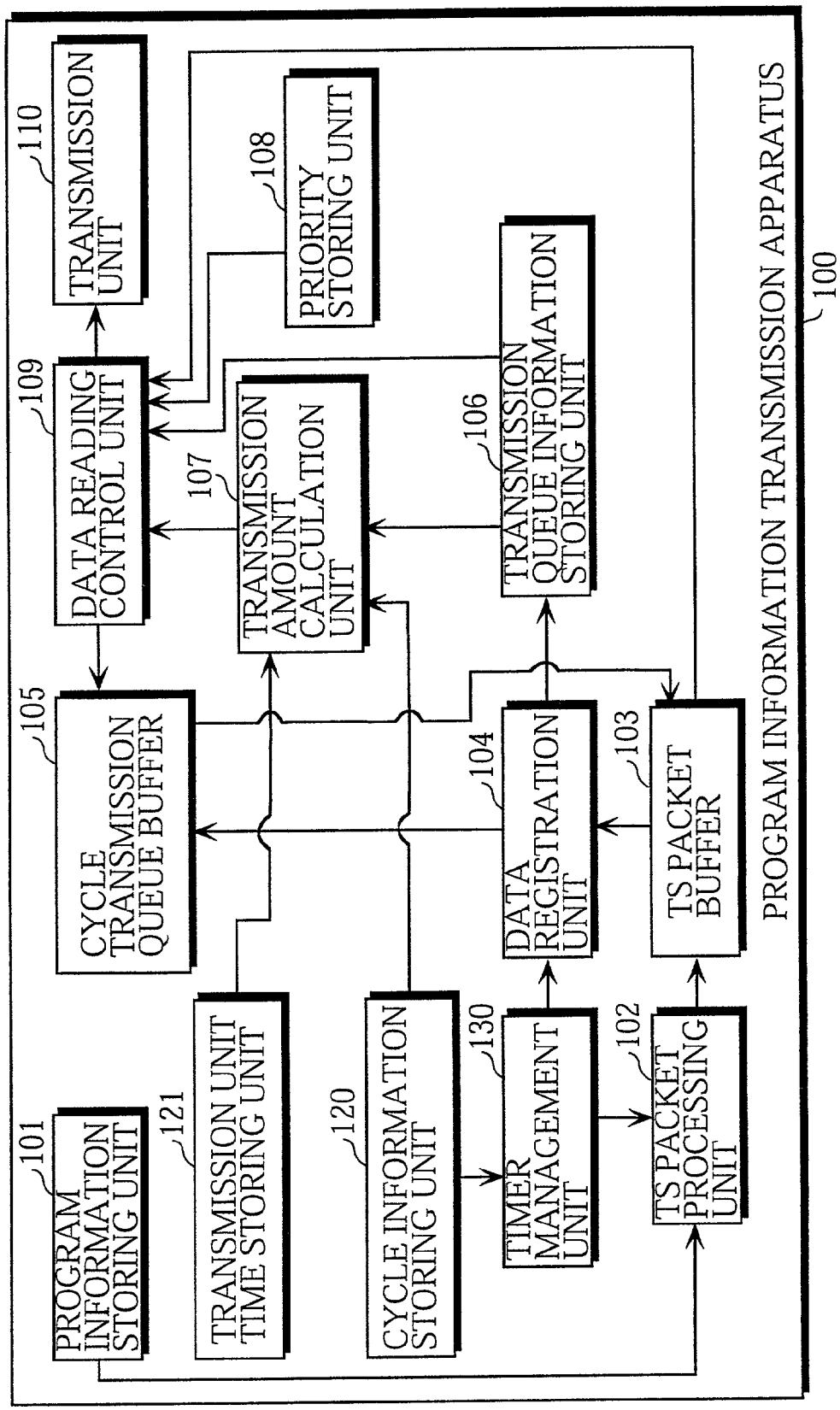
FIGS. 3A and 3B are block diagrams showing the construction of the program information transmission apparatus of the first embodiment.
Figure 3A:
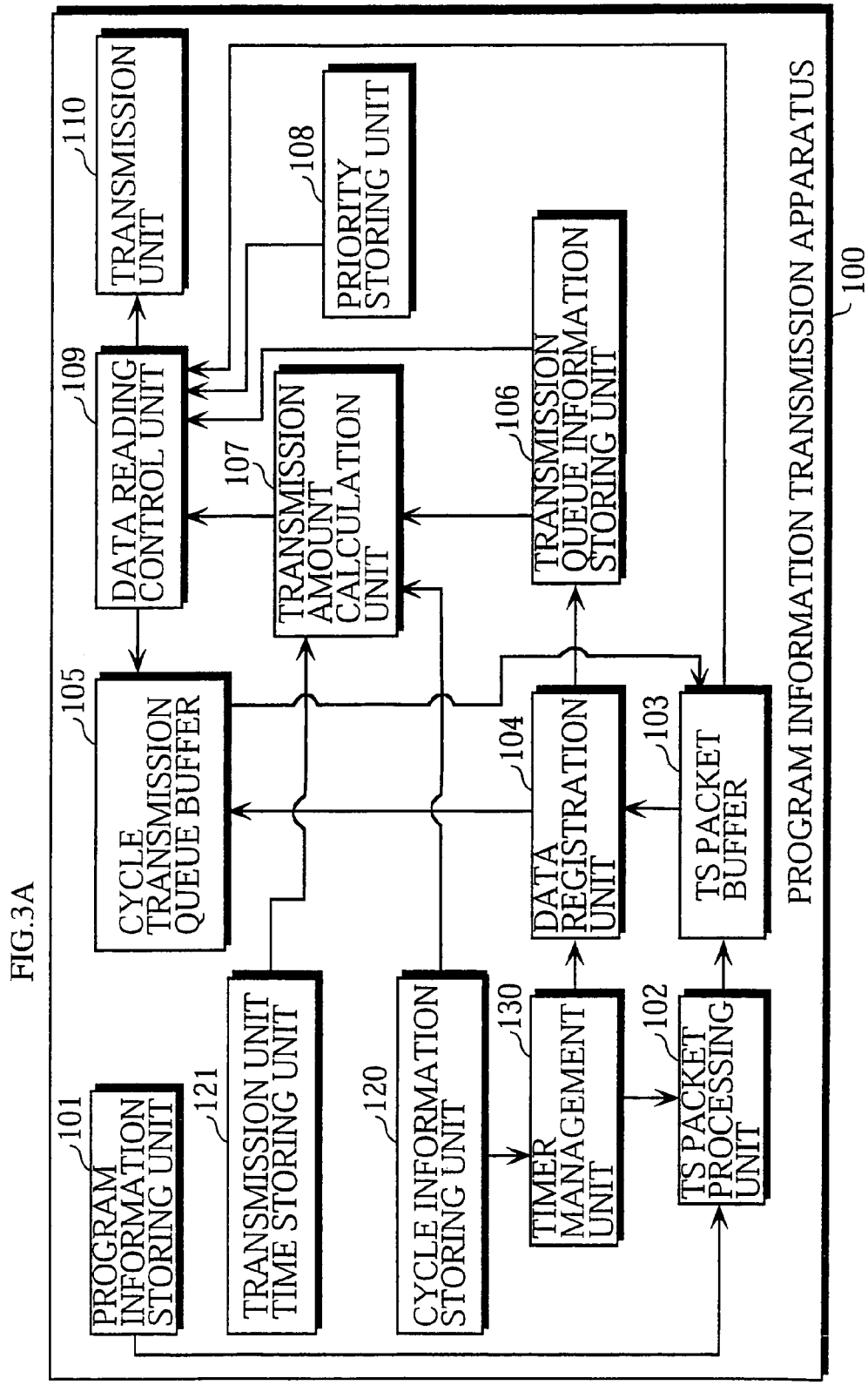

FIG. 3A is a block diagram showing the construction of the program information transmission apparatus 100 of the present embodiment. As shown in this drawing, the program information transmission apparatus 100 includes a program information storing unit 101, a transmission unit time storing unit 121, a cycle information storing unit 120, a timer management unit 130, a TS packet processing unit 102 or packet generating unit, a TS packet buffer 103, or holding unit, a data registration unit 104, a cycle transmission queue buffer 105, a transmission queue information storing unit 106, a transmission amount calculation unit 107, a priority storing unit 108, a data reading control unit 109, or packet fetching unit/selecting unit, and a transmission unit 110.

Figure 3B:
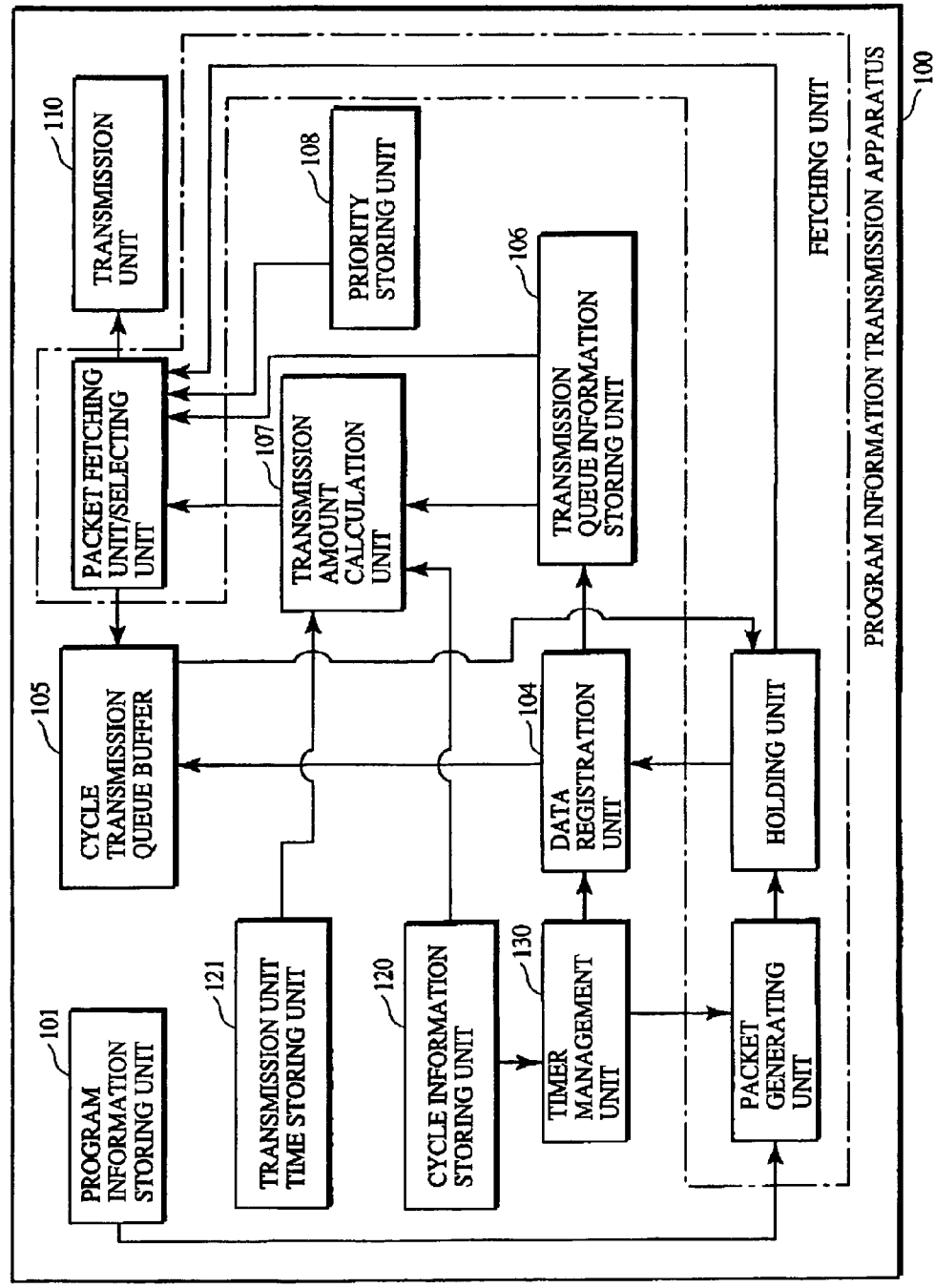

FIG. 3B is a modified block diagram of FIG. 3A to disclose a relationship between some of the cooperative elements in a fetching unit such as a packet generating unit, a holding unit to store the TS packets and packet fetching unit/selecting unit that can select each packet to be transmitted according to priorities assigned to a program information set or based on such priorities select another program information set whose packets are to be fetched.

Each of the program information storing unit 101, the cycle information storing unit 120, and the transmission unit time storing unit 121 stores information generated by the program generating apparatus 201.

The program information storing unit 101 stores at least one program information set. FIGS. 4A–4C show program information sets A, B, and C as examples. Each program information set in these drawings is generated and provided by a broadcast station and gives a start time 301, a broadcast length 302, a size 303, and a program description 304 for each program to be broadcasted by the broadcast station. Here, each broadcast station may generate and provide a plurality of program information sets. In FIGS. 4A–4C, the program information sets A and C relate to programs to be broadcasted by the same broadcast station, while the program information set B relates to programs to be broadcasted by a different broadcast station. The program information set A is a short-term program information set and gives information concerning programs to be broadcasted in the next 24 hours or so, while the program information set C is a long-term program information set and gives information concerning programs to be broadcasted in the next four weeks or so.

Each program information set in the program information storing unit 101 is divided into sections that are a unit stipulated by an MPEG standard. Here, each program information set is divided into sections so that each section contains information for a single channel and the data length of each section is no more than a predetermined length.

It should be noted here that in this embodiment, the program information storing unit 101 also stores information showing whether each program information set has been converted into TS packets by the TS packet processing unit 102.

The cycle information storing unit 120 stores cycle information showing the length of a cycle of each program information set. FIG. 5 shows example lengths of cycles of the program information sets A, B, and C. As shown in this drawing, the cycles of the program information sets A, B, and C are of "three seconds", "ten seconds", and "ten seconds", respectively.

Figure 6:
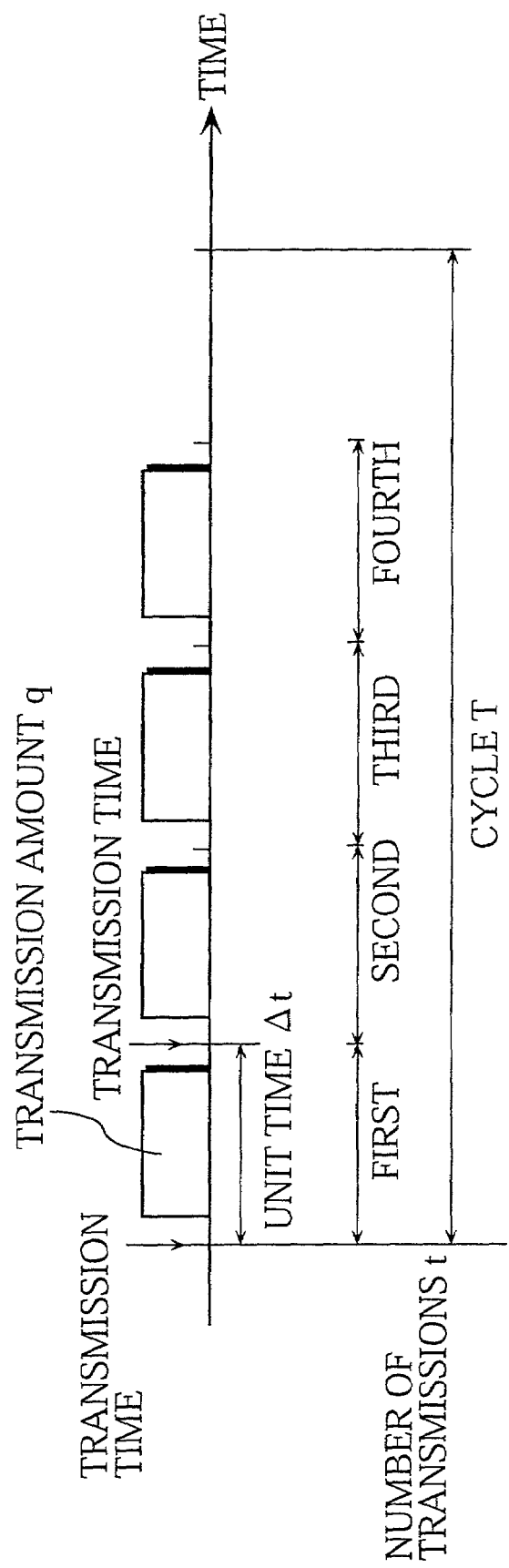
FIG. 6 shows a state where a cycle is divided into transmission periods according to a unit time.

The transmission unit time storing unit 121 stores unit time information that gives the length of a unit time for each program information set. The unit time is described below with reference to FIG. 6. To transmit program information at a constant rate through the cycle T, a cycle T is divided into a plurality of transmission periods, whose lengths are each equal to the length $\Delta t$ of a unit time, and program information of a transmission amount "q" is transmitted in each transmission period. In this specification, the transmission in the first transmission period is referred to as the "first transmission", the transmission in the next transmission period is referred to as the "second transmission", and the transmission in the "t"th transmission period is referred to as the ""t"th transmission". Also, the time "t×$\Delta t$" (corresponding to the start time of a transmission period) is referred to as the "transmission time". It should be noted here that in this embodiment, the length $\Delta t$ of each unit time is set as 100 ms.

The timer management unit 130 sends execution signals to the TS packet processing unit 102 and the data registration unit 104 according to the cycle information stored in the cycle information storing unit 120.

The TS packet processing unit 102 checks whether the program information storing unit 101 stores any program information sets that are yet to be converted into TS packets and, if so, converts the program information sets into TS packets. Here, each TS packet includes one payload and the TS packet processing unit 102 arranges each section in a payload. If all of a section cannot be arranged in a single payload, the TS packet processing unit 102 arranges the section across a plurality of payloads.

The TS packet processing unit 102 also embeds table IDs and subtable IDs into the payloads. Each table ID corresponds to one program information set and each subtable ID corresponds to one channel. Therefore, the TS packet processing unit 102 generates a plurality of TS packets, which form one table, from each program information set, and generates a plurality of TS packets, which form one subtable of a table, from each information set concerning a channel of a program information set. Here, each subtable includes at least one section.

The TS packet buffer 103 stores TS packets generated by the TS packet processing unit 102 so that the TS packets are separately stored with reference to the cycles of the TS packets and the tables to which the TS packets belong. FIGS. 7A and 7B show a state where TS packets are stored in the TS packet buffer 103. FIG. 7A shows TS packets having a cycle of three seconds and FIG. 7B shows TS packets having a cycle of ten seconds. In these drawings, A1(1)–A1(4) represent a subtable A1 of a table A. As can be seen from these drawings, the table A includes three subtables A1–A3 and each subtable includes four packets. Also, the table B includes one hundred subtables B1–B100 and each subtable includes four packets. Further, the table C includes three subtables C1–C3, the subtable C1 includes 69 packets, the subtable C2 includes 59 packets, and the subtable C3 includes 76 packets. Here, the vertical lines in the tables represent packet groups, that is, sections. More specifically, for instance, the packets C1(1)–C1(21) form a section and the packets C1(22)–C1(39) form another section. Here, if receiving packets where the continuity of packets of a section is interrupted by packets of another section, a reception apparatus cannot construct the original information, which is to say program information, from the packets. Therefore, the transmission apparatus needs to continuously transmit packets in a section.

The data registration unit 104 receives an instruction from the timer management unit 130 and writes, in each cycle, the pointers to TS packets corresponding to the cycle into corresponding transmission queues of the cycle transmission queue buffer 105. If the TS packets corresponding to the cycle are updated, the data registration unit 104 also stores information concerning the table, to which the updated TS packets belong, into the transmission queue information storing unit 106.

Figure 8:
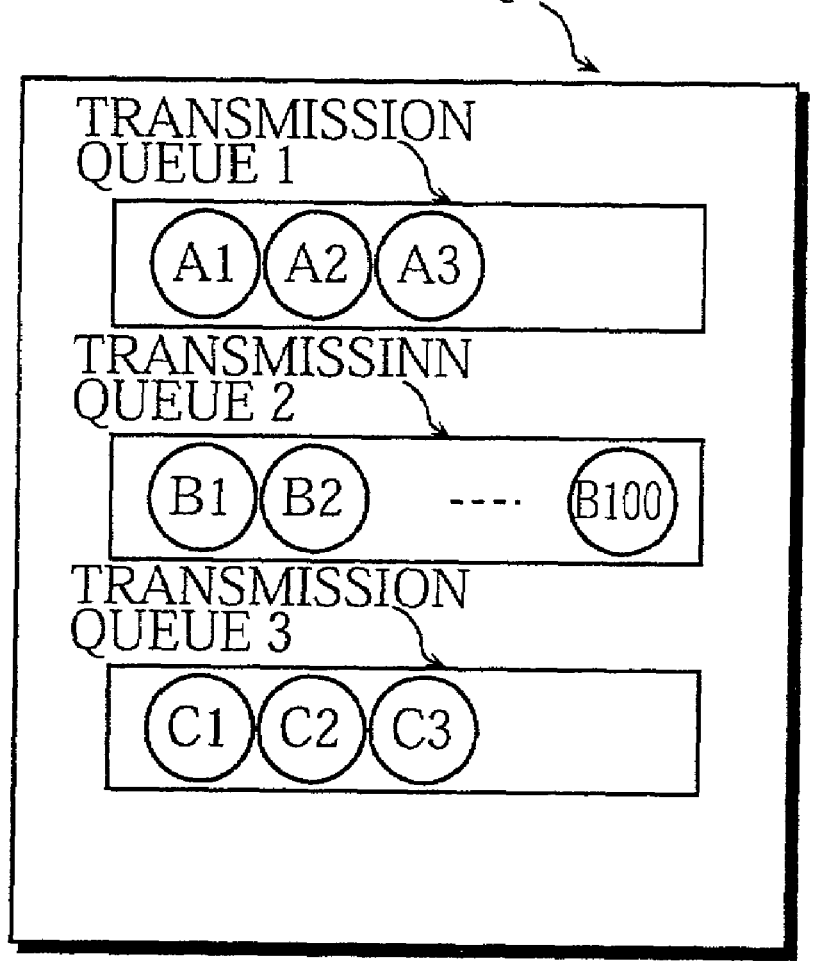
FIG. 8 shows a state where pointers to TS packets are stored in a cycle transmission queue buffer.

The cycle transmission queue buffer 105 includes a plurality of transmission queues. The pointers to TS packets that belong to different tables are written into different transmission queues. FIG. 8 shows a state where pointers to TS packets are stored in the cycle transmission queue buffer 105. As shown in this drawing, a transmission queue 1 stores each pointer to a packet that forms the table A (including the subtables A1–A3), a transmission queue 2 stores each pointer to a packet that forms the table B (including the subtables B1–B100), and a transmission queue 3 stores each pointer to a packet that forms the table C (including the subtables C1–C3). Each packet pointer written in the transmission queues is erased when the packet pointer is read by the data reading control unit 109.

The transmission queue information storing unit 106 stores transmission queue information. The transmission queue information is information concerning tables which include packets whose pointers are written in the transmission queues. FIG. 9 shows an example of the transmission queue information. As shown in this drawing, the transmission queue information gives the number of packets for each section of each subtable of each table stored in the transmission queues. Regarding the table C, for instance, the transmission queue information shown in FIG. 9 shows that the pointer to each packet of the table C is stored in the transmission queue 3, the table C includes three subtables, the subtable C1 includes four sections, and the sections 1–4 of the subtable C1 respectively include 21, 18, 22, and 8 packets.

The priority storing unit 108 stores priority information showing priorities for transmitting the tables. FIG. 10 shows an example of the priority information, where the highest priority is given to the table A, the next highest priority is given to the table B, and the lowest priority is given to the table C.

The transmission amount calculation unit 107 performs the processing described below, if the transmission queue information in the transmission queue information storing unit 106 is updated. According to the unit time information in the transmission unit time storing unit 121, the cycle information in the cycle information storing unit 120, and the transmission queue information in the transmission queue information storing unit 106, the transmission amount calculation unit 107 calculates a standard total transmission amount EL and each standard table transmission amount Emi. The standard total transmission amount EL represents the number of packets, out of packets of all tables, that should be transmitted in each transmission period. Each standard table transmission amount Emi represents the number of packets, out of packets of a table, that should be transmitted in each transmission period (where "i" specifies one of the tables respectively). FIG. 11 shows examples of the standard total transmission amount and standard table transmission amounts calculated by the transmission amount calculation unit 107.

The case of the table A is first described below. The cycle information storing unit 120 shows that the cycle of the table A is of three seconds and the transmission unit time storing unit 121 shows that the unit time of the table A is of 100 ms. Therefore, as shown in FIG. 11, the number of transmission periods in one cycle is found as 30 by dividing three seconds by 100 ms. Because the transmission queue information storing unit 106 shows that the number of packets of the table A is 12, the average number of packets to be transmitted per unit time is found as 0.4 packet by dividing 12 (packets) by 30. Because each packet cannot be divided into smaller parts and it is necessary to take into consideration the delay in processing by other construction elements, the transmission amount calculation unit 107 adds one to the average number of packets, drops the fractional portion of the addition result, and uses the calculation result "one packet" as the standard table transmission amount EM1.

The case of the table B is next described below. Because the cycle and the unit time of the table B are respectively of ten seconds and 100 ms, the number of transmission periods in one cycle is found as 100 by dividing ten seconds by 100 ms. Because the number of packets of the table B is 400, the average number of packets to be transmitted per unit time is found as four packets by dividing 400 packets by 100. In view of the delay in processing by other construction elements, the transmission amount calculation unit 107 adds one to the average number of packets, drops the fractional portion of the addition result, and uses the calculation result "five packets" as the standard table transmission amount EM2.

The case of the table C is finally described below. Because the cycle and the unit time of the table C are respectively of ten seconds and 100 ms, the number of transmission periods in one cycle is found as 100 by dividing ten seconds by 100 ms. Because the number of packets of the table C is 204, the average number of packets to be transmitted per unit time is found as 2.04 by dividing 204 by 100. Because each packet cannot be divided into smaller parts and it is necessary to take into consideration the delay in processing by other construction elements, the transmission amount calculation unit 107 adds one to the average number of packets, drops the fractional portion of the addition result, and uses the calculation result "three packets" as the standard table transmission amount EM3.

The transmission amount calculation unit 107 then totals EM1 (one packet), EM2 (five packets), and EM3 (three packets) and uses the calculation result "nine packets" as the standard total transmission amount EL.

The transmission amount calculation unit 107 holds the calculated values of EM1, EM2, EM3, and EL until the transmission queue information in the transmission queue information storing unit 106 is updated.

The data reading control unit 109 is the construction element that is the most important to the present invention. The data reading control unit 109 selects each packet to be transmitted according to the standard total transmission amount and the standard table transmission amounts calculated by the transmission amount calculation unit 107, the priority information in the priority storing unit 108, the transmission queue information in the transmission queue information storing unit 106, and Criteria A-1, B-1, B-2, and B-3 (described later). The data reading control unit 109 then reads each pointer to one of the selected packets from the cycle transmission queue buffer 105, reads each TS packet from the TS packet buffer 103 according to one of the read pointers, and outputs each read TS packet to the transmission unit 110.

Here, the packet selection described above is performed in consideration of the priority information so that program information is transmitted at a constant rate in a plurality of transmission periods and the transmission rate of each table is also set as constant as possible through a cycle. FIG. 12 shows Criteria A-1, B-1, B-2, and B-3 described above. Criterion A-1 relates to the transmission amount per unit time and Criteria B-1, B-2, and B-3 relate to the transmission order.

(Criterion A-1) The number of packets that are transmitted per unit time does not exceed the standard total transmission amount EL.
(Criterion B-1) The continuity of packets of a section is not interrupted by packets of another section during transmission.
(Criterion B-2) Packets of tables given higher priorities are transmitted first.
(Criterion B-3) When the amount (number) of transmitted packets of a current table reaches a corresponding standard table transmission amount Emi, the current table is switched to the next table.

The detailed description of how these criteria are applied is given in the next section "Operation".

The transmission unit 110 transmits TS packets outputted from the data reading control unit 109 to the TS multiplexing apparatus 203.

(Operation)

The following description concerns the operation of the data reading control unit 109 during data reading processing. FIG. 13 is a flowchart showing the operation procedure of the data reading control unit 109.

The data reading control unit 109 first selects a table according to the priority information in the priority storing unit 108. In this embodiment, as described above, the highest priority is given to the table A, the next highest priority is given to the table B, and the lowest priority is given to the table C. Therefore, the data reading control unit 109 selects the table A, the table B, and the table C in this order. After each table has been selected once, the data reading control unit 109 selects the tables A, B, and C in this order again. That is, the data reading control unit 109 cyclically selects the tables A, B, and C in this order to satisfy Criterion B-2 (step S2001).

The data reading control unit 109 then specifies a packet, which should be selected, of the currently selected table by referring to the transmission queue information. Following this, the data reading control unit 109 increments each of variables "Mi" and "L" by one. The variable Mi indicates the number of packets that have been selected from packets of the currently selected table. Also, the variable L indicates the number of packets that have been selected from packets of all tables. The data reading control unit 109 reads the pointer to the specified packet from the cycle transmission queue buffer 105. According to the read pointer, the data reading control unit 109 reads the specified packet from the TS packet buffer 103 and outputs the read packet to the transmission unit 110 (step S2002).

The data reading control unit 109 calculates an assumed transmission amount EL(t), which represents the number of packets of all tables to be transmitted by the end of the "t"th transmission period, from the number of transmissions t and the standard total transmission amount EL (EL×t) and compares the current value of the variable L with the assumed transmission amount EL(t). If the current value of the variable L is at least equal to the assumed transmission amount EL(t), the data reading control unit 109 terminates the selection of packets in the current transmission period and increments the number of transmissions t by one to wait for the current time to reach the next transmission time (t×Δt). In this manner, Criterion A-1 described above is satisfied.

If the current value of the variable L is smaller than the assumed transmission amount EL(t), the data reading control unit 109 judges that it is possible to further select packets, which have not yet been selected, in the current transmission period and the process proceeds to steps S2005 and S2006 (steps S2003 and S2004).

The data reading control unit 109 checks whether the lastly selected packet is the end of a section by referring to the transmission queue information (step S2005). If the lastly selected packet is not the end of a section, the process returns to step S2002 to read packets of the currently selected table. This is because in this case, the currently selected table must not be switched to the next table to satisfy Criterion B-1.

If the lastly selected packet is the end of a section in step S2005, the data reading control unit 109 calculates an assumed transmission amount EMi(t), which represents the number of packets of the currently selected table to be transmitted by the end of the "t"th transmission period, from the number of transmissions t and the standard table transmission amount EMi of the currently selected table (EMi×t). The data reading control unit 109 then compares the current value of the variable Mi with the assumed transmission amount EMi(t). If the current value of the variable Mi is smaller than the assumed transmission amount EMi(t), the process returns to step S2002 to further read packets of the currently selected table. In this manner, Criterion B-3 described above is satisfied.

If the current value of the variable Mi is equal to the assumed transmission amount EMi(t), the process returns to step S2001 to select the next table according to the priority information (step S2006).

EXAMPLE

The stated processing is described in detail below by taking an example.

FIG. 14A shows the process where packets are read and FIG. 14B shows assumed transmission amounts (EM1(t), EM2(t), EM3(t), and EL(t)) with actual transmission amounts (M1, M2, and M3).

The data reading control unit 109 first selects all packets A1(1)–A1(4) in the section A1 of the table A given the highest priority (L=4, M1=4). Because M1 is greater than EM1(1), the data reading control unit 109 selects the table B and selects all packets B1(1)–B1(4) in the section B1 of the table B (L=8, M2=4). Because M2 is below EM2(1), the data reading control unit 109 selects the packet B2(1) (L=9, M2=5)

Because L is equal to EL(1), the process proceeds to the next transmission (t=2). To maintain the continuity of the section B2, the data reading control unit 109 selects the packets B2(2)–B2(4) of the section B2 (L=12, M2=8). Because M2 is below EM2(2), the data reading control unit 109 selects the packets B3(1)–B3(4) (L=16, M2=12). Because M2 is greater than EM2(2), the data reading control unit 109 selects the table C and selects packets C1(1)–C1(2) of the table C (L=18, M3=2).

Because L is equal to EL(2), the process proceeds to the next transmission (t=3). To maintain the continuity of the section C1, the data reading control unit 109 selects the packets C1(3)–C1(11) of the section C1 (L=27, M3=11).

Because L is equal to EL(3), the process proceeds to the next transmission (t=4). To maintain the continuity of the section C1, the data reading control unit 109 selects the packets C1(12)–C1(20) of the section C1 (L=36, M3=20).

Because L is equal to EL(4), the process proceeds to the next transmission (t=5). To maintain the continuity of the section C1, the data reading control unit 109 selects the packet C1(21) of the section C1 (L=37, M3=21). Because M3 is greater than EM3 (5), the data reading control unit 109 selects the table A and selects the packets A2(1)–A2(4) of the table A (L=41, M1=8). Because M1 is greater than EM1(5), the data reading control unit 109 selects the table B and selects the packets B4(1)–B4(4) of the table B (L=45, M2=16).

Because L is equal to EL(5), the process proceeds to the next transmission (t=6) Because M2 is below EM2(6), the data reading control unit 109 selects the packets B5(1)–B5(4) (L=49, M2=20). Because M2 remains below EM2(6), the data reading control unit 109 selects the packets B6(1)–B6(4) (L=53, M2=24). Because M2 remains below EM2(6), the data reading control unit 109 selects the packets B7(1) (L=54, M2=25).

Because L is equal to EL(6), the process proceeds to the next transmission (t=7). To maintain the continuity of the section B7, the data reading control unit 109 selects the packets B7(2)–B7(4) (L=57, M2=28). Because M2 is below EM2(7), the data reading control unit 109 selects the packets B8(1)–B8(4) (L=61, M2=32). Because M2 remains below EM2(7), the data reading control unit 109 selects the packets B9(1)–B9(2) (L=63, M2=34).

Because L is equal to EL(7), the process proceeds to the next transmission (t=8). To maintain the continuity of the section B9, the data reading control unit 109 selects the packets B9(3)–B9(4) (L=65, M2=36). Because M2 is below EM2(8), the data reading control unit 109 selects the packets B10(1)–B10(4) (L=69, M2=40). Because M2 is equal to EM2(8), the data reading control unit 109 selects the table C and selects the packets C2(1)–C2(3) of the table C (L=72, M3=24).

Because L is equal to EL(8), the process proceeds to the next transmission (t=9). The remaining packets will be selected in a like manner.

Regarding the table A, the number of transmission periods in one cycle is 30. Therefore, when the number of transmissions t becomes 31, M1 is reset to "0" and the variable t of EM1(t) is also reset to "0" (the variable t of each of EM2(t), EM3(t), and EL(t) is not reset). Regarding each of the tables B and C, the number of transmission periods in one cycle is 100. Therefore, when the number of transmissions t becomes 101, the variable t is set as 1 and each of M1, M2, M3, and L is reset to "0".

(Conclusion)

As described above, the program information transmission apparatus of the present embodiment calculates the number of packets to be transmitted per unit time and transmits packets as many as the calculated number of packets in each transmission period. The packet transmission is performed in consideration of the priorities given to program information sets. The packet transmission is also performed so that each program information set is transmitted in as many transmission periods as possible in a cycle. This prevents a situation where a reception apparatus cannot receive all of program information.

The program information transmission apparatus to which the present invention is applied has been described above by means of the first embodiment, although it should be obvious that the present invention is not limited to this embodiment. Further variations are described below.

(1) Cycle Transmission Queue Buffer 105

In the first embodiment, the cycle transmission queue buffer 105 holds pointers to TS packets. However, the present invention is not limited to this and the cycle transmission queue buffer 105 may hold TS packets themselves. In this case, the data reading control unit 109 directly fetches TS packets from the cycle transmission queue buffer 105 and sends the fetched TS packets to the transmission unit 110.

(2) Transmission Amount per Unit Time

In the first embodiment, each standard transmission amount per unit time is set as a value calculated from the number of packets and a cycle. However, the present invention is not limited to this. For instance, each standard transmission amount per unit time may be set as a constant value determined in consideration of the processing capacities of reception apparatuses. Also, the present invention is not limited to a constant transmission amount per unit time. For instance, the present invention may use a variable transmission amount that does not exceed a predetermined level and satisfies certain conditions.

(3) Determination of Packet Transmission Time

In the first embodiment, the data reading control unit 109 selects packets to be transmitted in each transmission period and the transmission unit 110 transmits the selected packets. However, the present invention is not limited to this. For instance, at the first point in time when program information is updated, the data reading control unit 109 may determine a transmission order, the length of a unit time, and a transmission time within the unit time for each packet to be transmitted. In this case, the transmission unit 110 repeatedly transmits each packet at corresponding transmission times in each cycle.

(4) PSI Table Having Other PID

The first embodiment relates to the adjustment of the transmission of program information that is assigned specific PIDs. However, the present invention may be applied to any other information, such as other types of table, that is assigned different PIDs and is cyclically transmitted. Needless to say, in this case, the processing similar to that described above can be performed for the information assigned the different PIDs.

Second Embodiment

The second embodiment relates to a program information transmission apparatus that transmits program information using every transmission period in a cycle.

(Construction)

The construction of a program information transmission apparatus of the second embodiment is the same as that of the program information transmission apparatus 100 of the first embodiment. However, the transmission amount calculation unit 107 of the second embodiment operates in a manner different to that of the first embodiment.

More specifically, the transmission amount calculation unit 107 of the second embodiment calculates the standard total transmission amount EL and each standard table transmission amount Emi in a manner different to that of the first embodiment.

In the first embodiment, the transmission amount calculation unit 107 obtains each standard table transmission amount EMi by adding one to an average number of packets and dropping the fractional portion of the addition result. The transmission amount calculation unit 107 then calculates the standard total transmission amount EL by totaling EM1, EM2, EM3. In this case, the transmission amount EL becomes somewhat larger than the average number of packets. Therefore, although program information can be transmitted at a constant rate (at a rate of the transmission amount EL) in certain transmission periods in one cycle, transmission periods where no packets are transmitted are generated at the end of one cycle. In the second embodiment, therefore, the transmission amount calculation unit 107 sequentially obtains a number of packets for each transmission period without dropping the fractional portion of each average number of packets.

FIG. 15 shows an example state where transmission amounts are calculated in the present embodiment. The case of the table A is first described below. The cycle information storing unit 120 shows that the cycle of the table A is of three seconds and the transmission unit time storing unit 121 shows that the unit time of the table A is of 100 ms. Therefore, as shown in FIG. 15, the number of transmission periods in one cycle is found as 30 by dividing three seconds by 100 ms. Because the transmission queue information storing unit 106 shows that the number of packets of the table A is 12, the average number of packets that should be transmitted in each transmission period is found as 0.4 packet by dividing 12 (packets) by 30. Here, in view of the delay in processing by other construction elements, the transmission amount calculation unit 107 adds 0.1 to 0.4 packet and uses the addition result "0.5 packet" as the amended average number of packets. The transmission amount calculation unit 107 then obtains a number of packets ES1(t) by multiplying the amended average number of packets "0.5 packet" by the number of transmission periods t. Because each packet cannot be divided into smaller parts, the transmission amount calculation unit 107 rounds up ES1(t) to obtain an integer and uses the integer as an assumed transmission amount EM1(t) that represents the number of packets to be transmitted by the end of the "t"th transmission period.

The case of the table B is next described below. Because the cycle and the unit time of the table B are respectively of ten seconds and 100 ms, the number of transmission periods in one cycle is found as 100 by dividing ten seconds by 100 ms. Because the number of packets of the table B is 400, the average number of packets that should be transmitted in each transmission period is found as four packets by dividing 400 packets by 100. In view of the delay in processing by other construction elements, the transmission amount calculation unit 107 adds 0.1 to the average number of packets "four packets" and uses the addition result "4.1 packets" as the amended average number of packets. The transmission amount calculation unit 107 then obtains a number of packets ES2(t) by multiplying the amended average number of packets "4.1 packets" by the number of transmissions t. Because each packet cannot be divided into smaller parts, the transmission amount calculation unit 107 rounds up ES2(t) to obtain an integer and uses the integer as an assumed transmission amount EM2(t) that represents the number of packets to be transmitted by the end of the "t"th transmission period.

The case of the table C is finally described below. Because the cycle and the unit time of the table C are respectively of ten seconds and 100 ms, the number of transmission periods in one cycle is found as 100 by dividing ten seconds by 100 ms. Because the number of packets of the table C is 204, the average number of packets that should be transmitted in each transmission period is found as 2.04 by dividing 204 by 100. In view of the delay in processing by other construction elements, the transmission amount calculation unit 107 adds 0.1 to the average number of packets "2.04 packets", discarding the second and lower decimal places of the addition result "2.14 packets", and uses the calculation result "2.1 packets" as the amended average number of packets. The transmission amount calculation unit 107 then obtains a number of packets ES3(t) by multiplying the amended average number of packets "2.1 packets" by the number of transmission periods t. Because each packet cannot be divided into smaller parts, the transmission amount calculation unit 107 rounds up ES3(t) to obtain an integer and uses the integer as an assumed transmission amount EM3(t) that represents the number of packets to be transmitted by the end of the "t"th transmission period.

The transmission amount calculation unit 107 totals EM1(t), EM2(t), and EM3(t) and uses the addition result as the assumed transmission amount EL(t) representing the number of packets, out of packets of all tables, that should be transmitted by the end of the "t"th transmission period.

The transmission amount calculation unit 107 then obtains the transmission amount ELt(t) representing the number of packets, out of packets of all tables, that should be transmitted in the "t"th transmission period.

The transmission amount calculation unit 107 holds the calculated values of EM1(t), EM2(t), EM3(t), EL(t), and ELt(t) until the transmission queue information in the transmission queue information storing unit 106 is updated.

FIG. 16A shows the transmission amount in each transmission period in the first embodiment, while 16B shows the transmission amount in each transmission period in the second embodiment. In the first embodiment, as shown in FIG. 16A, although nine packets are transmitted in each of a plurality of transmission periods in the cycle T (the longest cycle of "10 seconds" among the cycles of three program information sets), all packets have been transmitted at some midpoint in the cycle T and transmission periods where no packets are transmitted are generated at the end of the cycle T. In the first embodiment, as described above, a somewhat larger number of packets are transmitted in each transmission period. Therefore, all of program information is transmitted in one cycle with reliability. This means that the first embodiment is suitable for the case where it is expected that the construction elements of the program information transmission apparatus and the TS multiplexing apparatus cannot process program information at desired speeds and the processing by the construction elements will be delayed.

In the second embodiment, as shown in FIG. 16B, although the number of packets transmitted in each transmission period is not constant, the program information is transmitted at an almost constant rate throughout the cycle T. Therefore, the second embodiment is suitable for a case where it is expected that the processing by the construction elements of the program information transmission apparatus and the TS multiplexing apparatus will hardly be delayed.

(Operation)

During data reading processing, the data reading control unit 109 of the present embodiment operates in the similar manner to that of the first embodiment.

The difference in data reading operation between the first and second embodiments is described below. In the first embodiment, the data reading control unit 109 calculates the assumed transmission amount EL(t), which represents the number of packets of all tables to be transmitted by the end of the "t"th transmission period, by multiplying the number of transmission periods t by the standard total transmission amount EL (EL×t), and calculates the assumed transmission amount EMi(t), which represents the number of packets of the currently selected table to be transmitted by the end of the "t"th transmission period, by multiplying the number of transmission periods t by the corresponding standard table transmission amount EMi (EMi×t). However, in the second embodiment, the data reading control unit 109 uses the assumed transmission amounts EL(t) and EMi(t) calculated by the transmission amount calculation unit 107 in the manner described above.

EXAMPLE

The stated operation is described in detail below by taking an example.

FIG. 17A shows the process where packets are read and FIG. 17B shows amended average numbers of packets (ES1(t), ES2(t), ES3(t)), assumed transmission amounts (EM1(t), EM2(t), EM3(t), and EL(t)), and actual transmission amounts (M1, M2, and M3).

Because the table A is given the highest priority, the data reading control unit 109 first selects all packets (A1(1)–A1(4)) in the section A1 of the table A (L=4, M1=4). Because M1 is greater than EM1(1), the data reading control unit 109 next selects all packets (B1(1)–B1(4)) in the section B1 of the table B (L=8, M2=4). Because M2 is smaller than EM2(1), the data reading control unit 109 selects the packet B2(1) of the table B (L=9, M2=5).

Because L is equal to EL(1), the processing proceeds to the second transmission (t=2). To maintain the continuity of the section B2, the data reading control unit 109 selects the packets B2(2)–B2(4) of the section B2 (L=12, M2=8). Because M2 is smaller than EM2(2), the data reading control unit 109 selects the packets B3(1)–B3(3) (L=15, M2=11).

Because L is equal to EL(2), the processing proceeds to the third transmission (t=3). To maintain the continuity of the section B3, the data reading control unit 109 selects the packet B3(4) of the second B3 (L=16, M2=12). Because M2 is smaller than EM2(3), the data reading control unit 109 selects the packets B4(1)–B4(4) (L=20, M2=16). Because M2 becomes greater than EM2(3), the data reading control unit 109 next selects the packets C1(1)–C1(2) of the section C1 of the table C (L=22, M3=2).

Because L is equal to EL(3), the processing proceeds to the fourth transmission (t=4). To maintain the continuity of the section C1, the data reading control unit 109 selects the packets C1(3)–C1(8) of the second C1 (L=28, M3=8).

Because L is equal to EL(4), the processing proceeds to the fifth transmission (t=5). To maintain the continuity of the section C1, the data reading control unit 109 selects the packets C1(9)–C1(15) of the second C1 (L=35, M3=15).

Because L is equal to EL(5), the processing proceeds to the sixth transmission (t=6). To maintain the continuity of the section C1, the data reading control unit 109 selects the packets C1(16)–C1(21) of the second C1 (L=41, M3=21).

Because L is equal to EL(6), the processing proceeds to the seventh transmission (t=7). Because M3 is greater than EM3(7), the data reading control unit 109 selects the table A. However, M1 is greater than EM1(6), the data reading control unit 109 selects the packets B5(1)–B5(4) and B6(1)–B6(3) of the table B (L=48, M2=23).

Because L is equal to EL(7), the processing proceeds to the eighth transmission (t=8). To maintain the continuity of the section B6, the data reading control unit 109 selects the packet B6(4) of the section B6 (L=49, M2=24). Because M2 is smaller than EM2(8), the data reading control unit 109 selects the packets B7(1)–B7(4) and B8(1) (L=54, M2=29).

Because L is equal to EL(8), the processing proceeds to the ninth transmission (t=9). The remaining packets will be selected in a like manner.

Like the first embodiment, regarding the table A, the number of transmission periods in one cycle is 30. Therefore, when the number of transmissions t becomes 31, M1 is reset to "0" and the variable t of EM1(t) is also reset to "0" (the variable t of each of EM2(t), EM3(t), and EL(t) is not reset). Regarding each of the tables B and C, the number of transmission periods in one cycle is 100. Therefore, when the number of transmissions t becomes 101, the variable t is set as 1 and each of M1, M2, M3, and L is reset to "0".

(Conclusion)

In the first embodiment, the program information transmission apparatus rounds up the average number of packets to obtain an integer and obtains the number of packets to be transmitted by multiplying the number of transmission periods t by the obtained integer. As described above, however, the program information transmission apparatus of the second embodiment multiplies the number of transmission periods t by the average number of packets, converts the multiplication result into an integer, and uses the integer as the corresponding number of packets to be transmitted. Therefore, the transmission of packets is not concentrated in certain transmission periods in one cycle and is performed using every transmission period in one cycle.

The program information transmission apparatus to which the present invention is applied has been described above by means of the second embodiment, although it should be obvious that the present invention is not limited to this embodiment. Further variations are described below.

(1) Regarding ESi(t)

In the second embodiment, ESi (t) is calculated by adding 0.1 to a corresponding average number of packets and multiplying the addition result by the number of transmission periods t. However, the present invention is not limited to this. For instance, ESi(t) may be calculated by multiplying the number of transmission periods t by a corresponding average number of packets to which no value has been added. Also, ESi(t) may be calculated by adding a positive value, such as 0.2, below one to a corresponding average number of packets and multiplying the addition result by the number of transmission periods t.

Third Embodiment

The third embodiment relates to a case where the program information transmission apparatus 100 of the first embodiment further includes a function of giving higher priority to the transmission of immediate program information that should be urgently provided to viewers.

(Construction)

Figure 18A:
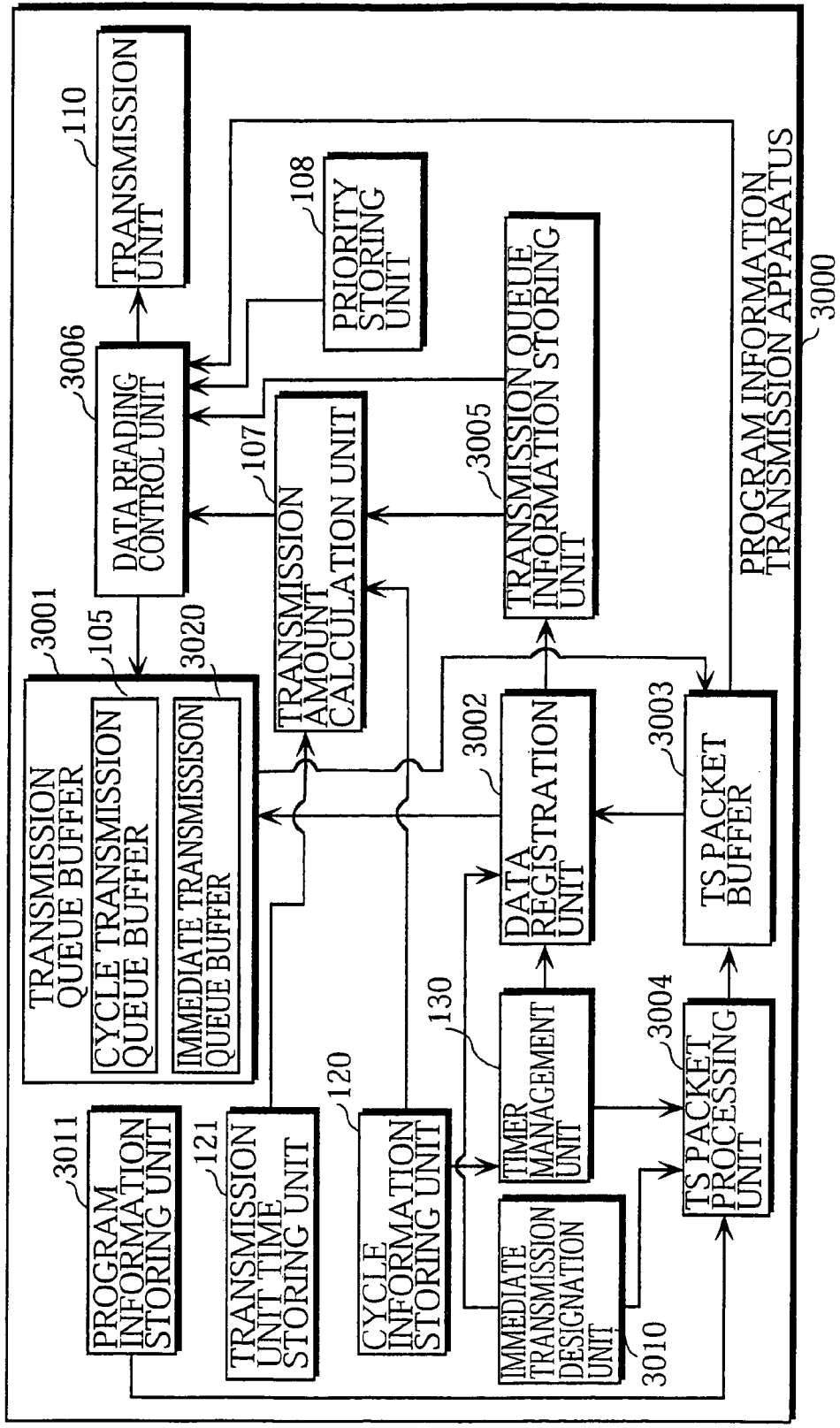
FIGS. 18A and 18B are block diagrams showing the construction of a program information transmission apparatus of the third embodiment.

FIG. 18A is a block diagram showing the construction of a program information transmission apparatus 3000 of the third embodiment.

The program information transmission apparatus 3000 differs from the program information transmission apparatus 100 of the first embodiment in that the program information transmission apparatus 3000 further includes an immediate transmission storing unit 3011, a TS packet processing unit 3004 or packet generating unit/second packet generating unit, a TS packet buffer 3003 or holding unit, a data registration unit 3002, a transmission queue buffer 3001, a transmission queue information storing unit 3005, and a data reading control unit 3006 prohibiting unit/transmission (control) unit/prohibition lending unit instead of the corresponding units of the program information transmission apparatus 100. Other construction elements of the program information transmission apparatus 3000 are the same as those of the program information transmission apparatus 100.

Figure 18B:
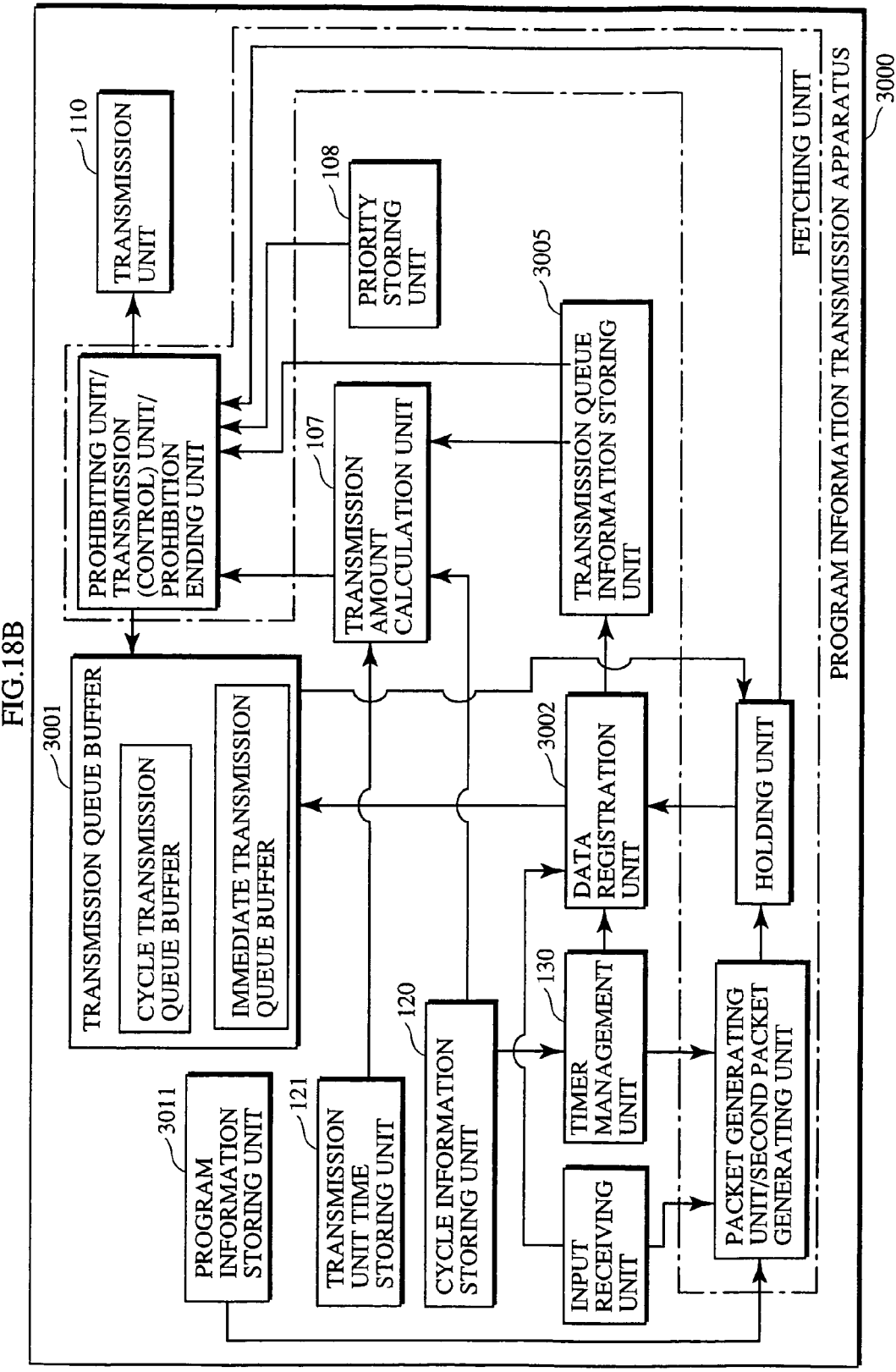

FIG. 18B is a modified block diagram of FIG. 18A to disclose a relationship between some of the cooperative elements in a fetching unit such as a packet generating unit which can function also as a second packet generating unit to generate a plurality of packets of a fixed length from inputted immediate program information, a holding unit that can hold a plurality of packets so that packets belonging to different program information sets are held in different queues, and a control unit that can respectively function as a prohibiting unit to prohibit, if immediate program information is inputted, the packets fetching unit from fetching packets from a queue, a transmission control unit to control the segmented transmission of packets generated by the second packet generating unit, and a prohibition ending unit to instruct, after all of the packets generated by the second packet generating unit are transmitted, the prohibiting unit to end a prohibition operation.

The immediate transmission designation unit 3010 receives, from the program generation apparatus 201, a notification that there is immediate program information that needs to be urgently transmitted. On receiving this notification, the immediate transmission designation unit 3010 designates the TS packet processing unit 3004 and the data registration unit 3002 to start processing.

The program information storing unit 3011 stores immediate program information that should be urgently transmitted as well as program information that should be cyclically transmitted. Here, the immediate program information is, for instance, information concerning programs whose broadcast times are changed due to a baseball broadcast being extended.

The TS packet processing unit 3004 receives instructions from the immediate transmission designation unit 3010 as well as the timer management unit 130. On receiving an instruction from the immediate transmission designation unit 3010, the TS packet processing unit 3004 generates TS packets from the immediate program information in the program information storing unit 3011. In this specification, the TS packets generated in this manner are referred to as the "immediate transmission packets" and usual TS packets that are generated by the instruction from the timer management unit 130 are referred to as the "cycle transmission packets".

The TS packet buffer 3003 stores immediate transmission packets as well as cycle transmission packets. FIGS. 19A–19C show an example state where immediate transmission packets as well as cycle transmission packets are stored in the TS packet buffer 3003. FIG. 19A shows cycle transmission packets having a cycle of three seconds and FIG. 19B shows cycle transmission packets having a cycle of ten seconds. Therefore, these drawings are the same as FIGS. 7A and 7B. FIG. 19C shows immediate transmission packets. In this drawing, D1(1)–D1(4) represent four packets that form a section D1 (a subtable) of a table D. As can be seen from this drawing, the table D includes three subtables (sections), which each include four packets.

The data registration unit 3002 performs the processing described below, in addition to the processing described in the first embodiment. On receiving an instruction from the immediate transmission designation unit 3010, the data registration unit 3002 stores pointers to the immediate transmission packets in the TS packet buffer 3003 into the immediate transmission queue buffer 3020 and stores information concerning tables, to which the immediate transmission packets belong, into the transmission queue information storing unit 3005.

Figure 20:
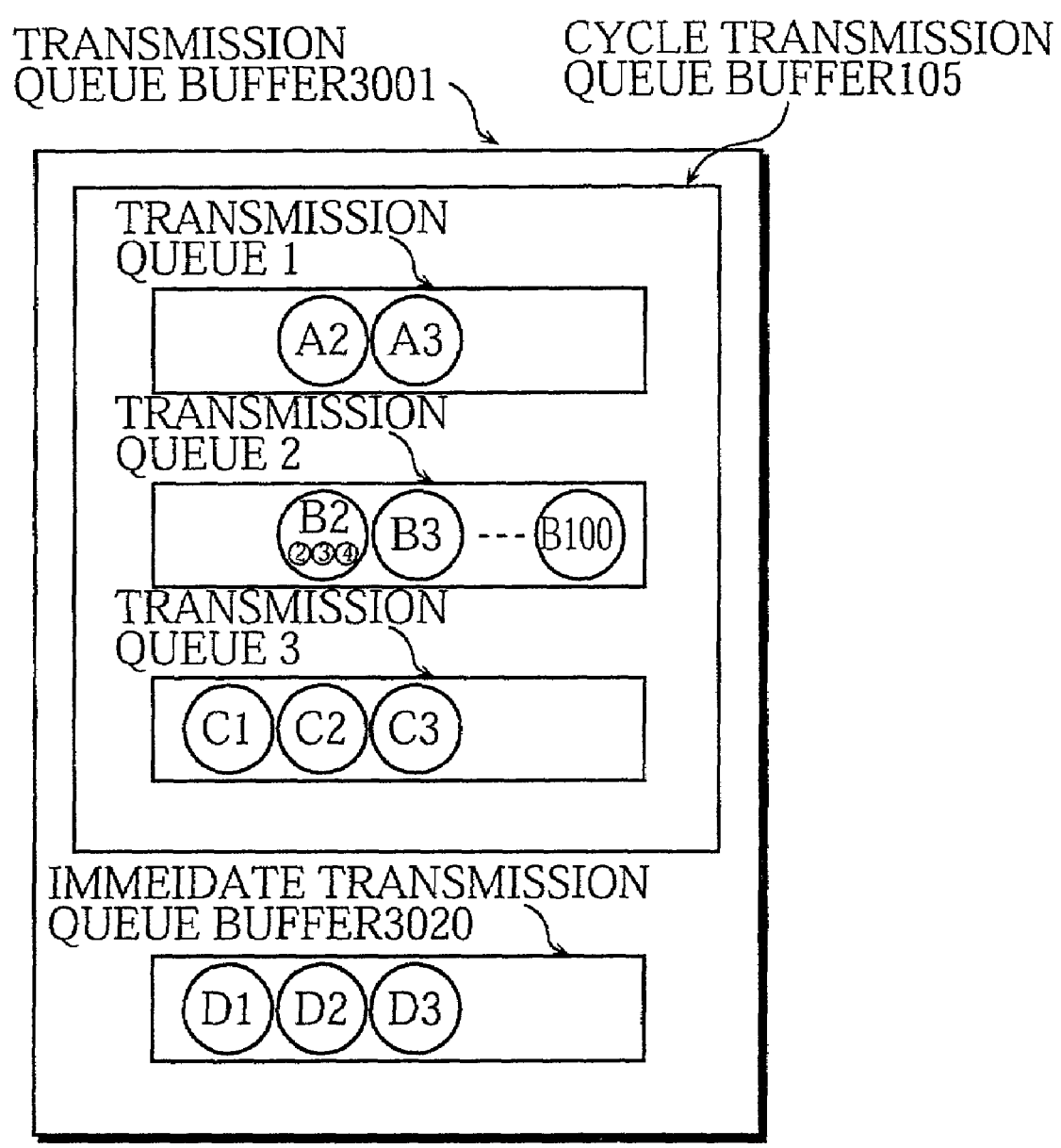
FIG. 20 shows an example state where TS packets are stored in a transmission queue buffer at the second transmission time.

The transmission queue buffer 3001 includes an immediate transmission queue buffer 3020, in addition to the cycle transmission queue buffer 105 described in the first embodiment. FIG. 20 shows an example state where TS packets are stored in the transmission queue buffer 3001 of the second transmission period. In this drawing, like the first embodiment, the transmission queues 1–3 respectively store packet pointers concerning tables A–C, although all packets of the section A1, all packets of the section B1, and the first packet of the section B2 have already been read because this drawing shows a state at the second transmission time. Also, the immediate transmission queue buffer 3020 stores packet pointers concerning the table D (including subtables D1–D3).

The transmission queue information storing unit 3005 stores transmission queue information that includes information concerning tables, to which packets in the cycle transmission queue buffer 105 belong, and information concerning tables, to which packets in the immediate transmission queue buffer 3020 belong. FIG. 21 shows an example of the transmission queue information. In this drawing, information concerning the transmission queues 1, 2, and 3 is the same as that of the first embodiment shown in FIG. 9. This drawing also shows that the immediate transmission queue buffer 3020 stores packet pointers concerning the table D, the table D includes three subtables, each subtable includes one section, and each section includes four packets.

The data reading control unit 3006 controls the reading of immediate transmission packets as well as the reading of cycle transmission packets. The control of the reading of cycle transmission packets has been described in the first embodiment. The data reading control unit 3006 usually controls the reading of cycle transmission packets and, when pointers to immediate transmission packets are registered in the immediate transmission queue buffer 3020, the data reading control unit 3006 controls the reading of the immediate transmission packets. During the reading control for immediate transmission packets, the data reading control unit 3006 checks whether the lastly selected packet is the end of a section by referring to the transmission queue information in the transmission queue information storing unit 3005. If the lastly selected packet is the end of a section, the data reading control unit 3006 performs the selection of the immediate transmission packets. If the lastly selected packet is not the end of a section, the data reading control unit 3006 reads each pointer to a packet, which has not yet been selected, of the current section from the cycle transmission queue buffer 105, reads each packet corresponding to one of the read pointers from the TS packet buffer 3003, and outputs each read packet to the transmission unit 110. After each read packet is outputted to the transmission unit 110 or if the lastly selected packet is the end of a section, the data reading control unit 3006 reads each pointer to an immediate transmission packet from the immediate transmission queue buffer 3020, reads each immediate transmission packet corresponding to one of the read pointers from the TS packet buffer 3003, and outputs each read immediate transmission packet to the transmission unit 110.

Because the immediate transmission packets need to be urgently transmit, the data reading control unit 3006 transmits the immediate transmission packets in defiance of the standard total transmission amount in the current transmission period. Therefore, in the next transmission period, the data reading control unit 3006 temporarily refrains from transmitting cycle transmission packets to adjust the excess transmission amount. More specifically, the data reading control unit 3006 adds the number of transmitted packets, which exceeds the standard total transmission amount, to the variable L representing the total number of transmitted packets and refrains from selecting and transmitting cycle transmission packets until the variable L falls below the assumed transmission amount EL(t). In this case, there is an apprehension that the transmission of cycle transmission packets will be delayed, in comparison with the case where only cycle transmission packets are transmitted, and it becomes impossible to transmit all cycle transmission packets within one cycle T. In view of this problem, the present embodiment is based on the assumption that a somewhat large transmission amount per unit time is preset to obtain, at the end of each cycle, a vacant period where no packet will be transmitted. Because the vacant period can be used to transmit extra packets as necessary, it is guaranteed that all cycle transmission packets are transmitted within one cycle.

(Operation)

The following description concerns the operation of the data reading control unit 3006 during reading control processing.

Figure 22:
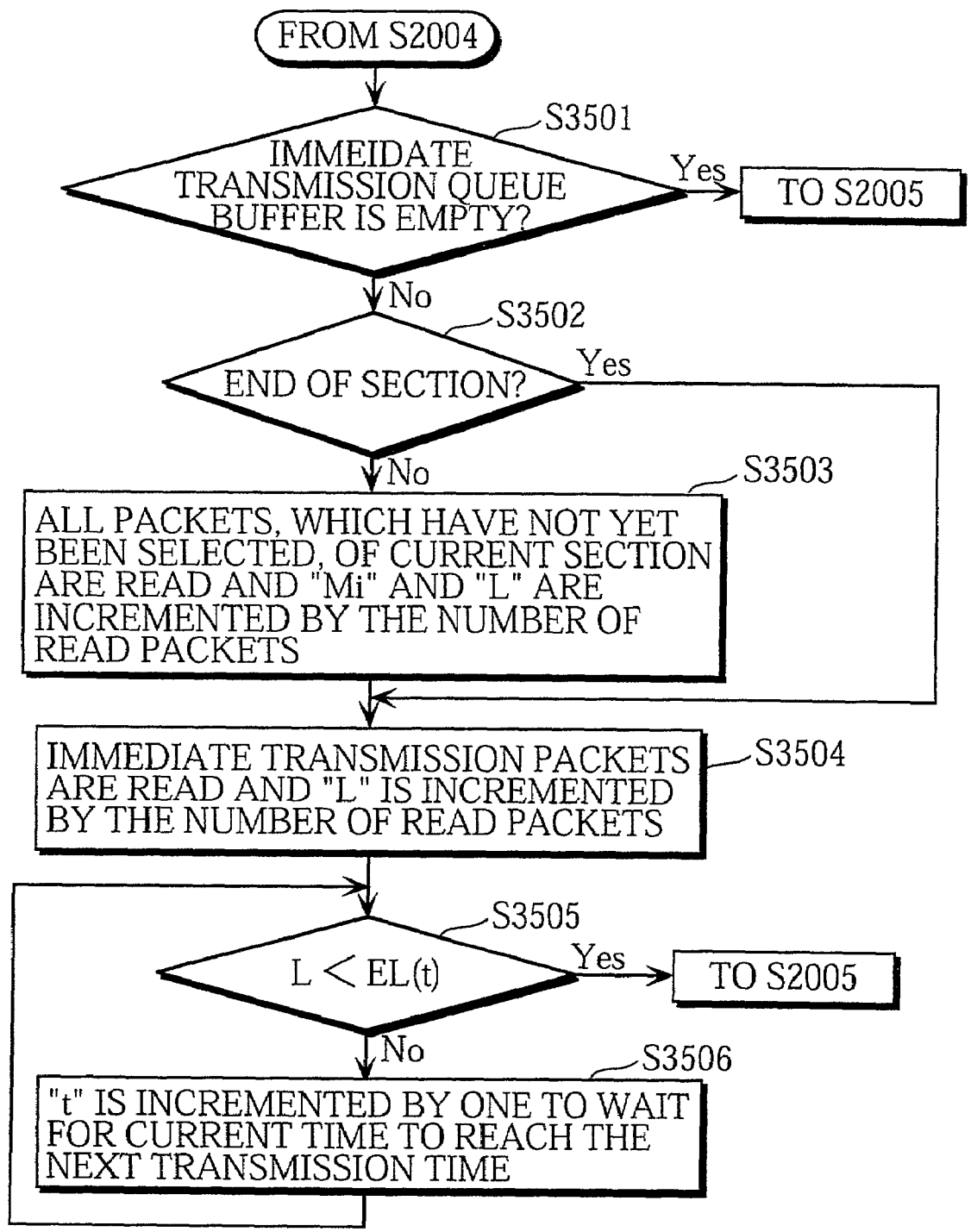
FIG. 22 is a flowchart showing the operation procedure where a data reading control unit controls the reading of immediate transmission packets.

FIG. 22 is a flowchart showing the operation procedure where the data reading control unit 3006 controls the reading of immediate transmission packets.

The data reading control unit 3006 of the present embodiment operates in the similar manner to that of the first embodiment if there is no program information that needs to be urgently transmitted. Accordingly, in usual cases, the data reading control unit 3006 operates according to the flowchart shown in FIG. 13, although whether pointers to immediate transmission packets are registered in the immediate transmission queue buffer 3020 is checked after step S2004 shown in FIG. 13 (step 3501). If no pointers to immediate transmission packets are registered in the immediate transmission queue buffer 3020, the process proceeds to step S2005 shown in FIG. 13 and the data reading control unit 3006 continues the usual reading control for cycle transmission packets. If pointers to immediate transmission packets are registered in the immediate transmission queue buffer 3020, the process proceeds to step 3502 shown in FIG. 22.

The data reading control unit 3006 checks whether the lastly selected packet is the end of a section by referring to the transmission queue information storing unit 3005 (step S3502) and, if so, the process proceeds to step S3504.

If the lastly selected packet is not the end of a section, the data reading control unit 3006 specifies each packet, which has not yet been selected, of the current section. This is because the continuity of packets of a section must not be interrupted by packets of another section, as described above. The data reading control unit 3006 then increments each of the variables Mi and L by the number of the specified packets. As described in the first embodiment, the variable Mi represents the number of packets selected from packets of the currently selected table and the variable L represents the number of packets selected from packets of all tables.

The data reading control unit 3006 then reads each pointer to one of the specified packets from the cycle transmission queue buffer 105. According to each read pointer, the data reading control unit 3006 reads each specified packet from the TS packet buffer 3003 and outputs each read packet to the transmission unit 110 (steps S3502 and S3503).

The data reading control unit 3006 reads each pointer to an immediate transmission packet from the immediate transmission queue buffer 3020. According to each read pointer, the data reading control unit 3006 reads each immediate transmission packet from the TS packet buffer 3003 and outputs each read packet to the transmission unit 110. Following this, the data reading control unit 3006 increments the variable L by the number of the read immediate transmission packets (step S3504).

The data reading control unit 3006 then calculates an assumed transmission amount EL(t) in the current transmission period from the number of transmission periods t and the standard total transmission amount EL (EL×t) and compares the current value of the variable L with the assumed transmission amount EL(t). If the current value of the variable L is at least equal to the assumed transmission amount EL(t), the data reading control unit 3006 terminates the selection of packets in the current transmission period and increments the number of transmission periods t by one to wait for the current time to reach the next transmission time (t×Δt).

When the current value of the variable L is below the assumed transmission amount EL(t), the process proceeds to step S2005 shown in FIG. 13 and the data reading control unit 3006 returns to the usual reading control for cycle transmission packets (steps S3505 and S3506).

EXAMPLE

The stated processing is described in detail below by taking an example.

FIG. 23A shows the process where packets are read and FIG. 23B shows assumed transmission amounts (EM1(t), EM2(t), EM3(t), and EL(t)) with actual transmission amounts (M1, M2, M3, M4, and L). Here, the assumed transmission amounts EM1-EL(t) and the actual transmission amounts M1-M3 and L are the same as those in the first embodiment. The actual transmission amount M4 represents the number of packets that have been selected from packets of the table D.

During the first transmission (t=1), like the first embodiment, the data reading control unit 109 selects all packets in the section A1, all packets in the section B1, and the packet B2(1) in the section B2 (M1=4, M2=5, M3=0, L=9).

During the second transmission (t=2), pointers to immediate transmission packets D1(1)–D1(4), D2(1)–D2(4), and D3(1)–D3(4) are registered in the immediate transmission queue buffer 3020. Therefore, the data reading control unit 3009 starts the reading control for the immediate transmission packets.

Because not all packets of the section B2 have been read during the first transmission, the data reading control unit 3009 first selects the remaining packets B2(2)–B2(4) of the section B2 (L=12, M2=8).

The data reading control unit 3009 then selects the immediate transmission packets D1(1)–D1(4), D2(1)–D2(4), and D3(1)–D3(4) (L=24, M4=12).

Because L is greater than EL(2), the process proceeds to the next transmission (t=3).

Because L is below EL(3), the data reading control unit 3009 resumes the selection of cycle transmission packets, that is, selects the next cycle transmission packets B3(1)–B3(3) (L=27, M2=11).

Because L is equal to EL(3), the process proceeds to the next transmission (t=4).

The remaining cycle transmission packets will be sequentially selected in the manner described in the first embodiment.

(Conclusion)

As described above, with the program information transmission apparatus of the third embodiment, immediate program information that should be urgently transmitted is given higher priority than cycle program information during transmission. Also, after the transmission of immediate program information, the transmission of the cycle program information is refrained for a period that corresponds to the number of transmitted packets that exceeds the standard total transmission amount. This guarantees that no overflows will occur in reception buffers of reception apparatuses and the reception apparatuses will obtain program information without problems.

The program information transmission apparatus to which the present invention is applied has been described above by means of the third embodiment, although it should be obvious that the present invention is not limited to this embodiment. Further variations are described below.

(1) Regarding Period Where Transmission of Cycle Transmission Packet Is Refrained after Transmission of Immediate Transmission Packet In the third embodiment, the transmission amount per unit time "q" is set as a value that is somewhat greater than a value obtained by dividing the number of cycle transmission packets by the number of transmission periods in one cycle. Consequently, a vacant period where no packet will be transmitted is generated at the end of each cycle. After immediate transmission packets are transmitted, the transmission of cycle transmission packets is refrained until the assumed transmission amount EL(t) exceeds the number of the actually transmitted packets. In this manner, the transmission amount in several transmission periods near the time when the immediate transmission packets are transmitted becomes constant. However, the present invention is not limited to this. If the buffers of reception apparatuses are capable of receiving and processing immediate transmission packets as well as cycle transmission packets, for instance, the adjustment of the excess transmission amount does not need to be performed after the transmission of immediate transmission packets, unlike the third embodiment. As a result, in this case, cycle transmission packets can be transmitted in the next transmission period as usual.

(2) Regarding Control of Data Reading

In the third embodiment, the data reading control unit 3006 reads both of cycle transmission packets and immediate transmission packets from the cycle transmission queue buffer and the immediate transmission queue buffer, respectively. However, the present invention is not limited to this. For instance, two data reading control units may be used, one of which is used for immediate transmission packets and the other of which is used for cycle transmission packets. Note that the data reading control unit used for immediate transmission packets is hereinafter referred to as the "immediate reading control unit" and the data reading control unit used for cycle transmission packets is hereinafter referred to as the "cycle reading control unit". In this case, a switching control unit for controlling the switching between these data reading control units is used. After the cycle reading control unit reads cycle transmission packets, which have not yet been selected, of a current section, the switching control unit prohibits the cycle reading control unit from reading cycle transmission packets. Then, the immediate reading control unit reads immediate transmission packets and adjusts the excess transmission amount. Finally, the switching control unit removes the prohibition on the packet reading by the cycle reading control unit.

What is claimed is:

1. A program information transmission apparatus that repeatedly transmits program information with a predetermined cycle, comprising:

a storing unit operable to store information showing a maximum number for each transmission period that is a period within the cycle and has a length of a unit time shorter than the cycle, each maximum number for one transmission period being a number of packets that should be transmitted in the transmission period;

a packet generating unit operable to generate a plurality of packets of a fixed length from program information sets, each of which includes a part of the program information;

a holding unit operable to hold the plurality of packets so that packets belonging to different program information sets are held in different queues;

a fetching unit operable to fetch the plurality of packets from the queues in a predetermined order so that a number of packets fetched in each transmission period does not exceed the maximum number for the transmission period;

a transmission unit operable to sequentially transmit each fetched packet;

a calculation unit operable to recalculate each maximum number, each time at least one program information set is updated or is newly registered, wherein the calculation unit includes:

a first calculation unit operable to divide a data amount of each program information set by a number of transmission periods within the cycle and set a division result obtained for each program information set as an average number for the program information set without rounding up or discarding a fractional portion of the division result, each average number for one program information set being a number of packets of the program information set that should be transmitted per unit time;

a second calculation unit operable to calculate, for each program information set, a cumulative number of packets of the program information set that should be transmitted by an end of an "n"th transmission period by multiplying the average number for the program information set by "n";

a third calculation unit operable to total the cumulative numbers calculated by the second calculation unit; and a fourth calculation unit operable to calculate the maximum number for the "n"th transmission period from the total calculated by the third calculation unit, wherein the information in the storing unit is overwritten with the maximum number calculated by the fourth calculation unit.

2. The program information transmission apparatus of claim 1,
wherein the second calculation unit adds a predetermined positive value that does not exceed one to each average number, sets each addition result as a new average number, multiplies each new average number by "n", obtains an integer by rounding up each multiplication result, and sets each integer as one cumulative number.

3. The program information transmission apparatus of claim 1,
wherein packets generated from one program information set is divided into at least one sections, and
the packet fetching unit is controlled to fetch all packets in a current section before fetching packets in another section.

4. The program information transmission apparatus of claim 1,
wherein each program information set is assigned a priority, and
the packet fetching unit fetches the plurality of packets from the queues according to the priorities assigned to the program information sets.

5. The program information transmission apparatus of claim 4,
wherein the storing unit also stores each cumulative number calculated by the second calculation unit, and
after fetching the last packet of a current section in the "n"th transmission period, the packet fetching unit refers to the information in the storing unit and, if a number of hitherto fetched packets of a program information set including the current section is at least equal to the cumulative number for the program information set, selects another program information set assigned a next higher priority as a program information set whose packets are to be fetched.

6. The program information transmission apparatus of claim 1 further comprising:
an input receiving unit operable to receive an input of immediate program information that should be urgently transmitted;
a prohibiting unit operable to prohibit, if immediate program information is inputted, the packet fetching unit from fetching packets;
a second packet generating unit operable to generate a plurality of packets of a fixed length from the inputted immediate program information;
a transmission control unit operable to control the transmission unit to sequentially transmit all of the packets generated by the second packet generating unit; and
a prohibition ending unit operable to instruct, after all of the packets generated by the second packet generating unit are transmitted, the prohibiting unit -to end the prohibition operation.

7. The program information transmission apparatus of claim 6,
wherein the prohibiting unit waits for all packets of a section, which includes a packet fetched immediately before the immediate program information was inputted, to be fetched before starting the prohibition operation.

8. The program information transmission apparatus of claim 1 further comprising:
an input receiving unit operable to receive an input of immediate program information that should be urgently transmitted;
a prohibiting unit operable to prohibit, if immediate program information is inputted, the packet fetching unit from fetching packets;
a second packet generating unit operable to generate a plurality of packets of a fixed length from the inputted immediate program information;
a transmission control unit operable to control the transmission unit to sequentially transmit all of the packets generated by the second packet generating unit; and
a prohibition ending unit operable to perform, after all of the packets generated by the second packet generating unit are transmitted, packet transmission adjustment for a number of transmitted packets exceeding the maximum number for the "n"th transmission period, before instructing the prohibiting unit to end the prohibition operation.

9. The program information transmission apparatus of claim 8,
wherein the prohibiting unit waits for all packets of a section, which includes a packet fetched immediately before the immediate program information was inputted, to be fetched before starting the prohibition operation, and
the prohibition ending unit waits for a number of packets, whose transmission is refrained after all packets generated by the second packet generating unit are transmitted, reaches a number of transmitted packets exceeding the maximum number for the "n"th transmission period, before instructing the prohibiting unit to end the prohibition operation.

10. A program information transmission apparatus that repeatedly transmits program information with a predetermined cycle, comprising:
a storing unit operable to store information showing a transmission amount per unit time, the unit time being shorter than the cycle;
a fetching unit operable to fetch the program information in parts so that each fetched part of the program information has a size within the transmission amount per unit time; and
a transmission unit operable to sequentially transmit each fetched part of the program information,
wherein the information in the storing unit shows, as the transmission amount per unit time, a maximum number of packets that should be transmitted per unit time,
the fetching unit includes:
a packet generating unit operable to generate a plurality of packets of a fixed length from program information sets, each of which includes a part of the program information;
a holding unit operable to hold the plurality of packets so that packets belonging to different program information sets are held in different queues; and
a packet fetching unit operable to fetch the plurality of packets from the queues in a predetermined order so that a number of packets fetched per unit time does not exceed the maximum numbers,
packets generated from one program information set is divided into at least one section, and
the packet fetching unit is controlled to fetch all packets in a current section before fetching packets in another section,
the program information transmission apparatus further comprising:
a calculation unit operable to recalculate the maximum number, each time at least one program information set is updated or is newly registered, wherein the calculation unit includes:
a first calculation unit operable to calculate a maximum number for each program information set from a data amount of the program information set and the cycle, each maximum number calculated for one program information set being a maximum number of packets of the program information set that should be transmitted per unit time; and
a second calculation unit operable to calculate a total of the maximum numbers calculated by the first calculation unit, and
the information in the storing unit is overwritten with the total calculated by the second calculation unit.

11. The program information transmission apparatus of claim 10,
wherein each program information set is assigned a priority, and
the packet fetching unit fetches the plurality of packets from the queues according to the priorities assigned to the program information sets.

12. The program information transmission apparatus of claim 11,
wherein the storing unit also stores each maximum number calculated by the first calculation unit, and
the packet fetching unit includes:
a cumulative calculation unit operable to, after the packet fetching unit fetches the last packet of a current section in an "n"th transmission period, calculate a cumulative number for a program information set including the current section by multiplying the maximum number for the program information set by "a", each transmission period being a period within the cycle and having a length of the unit time, the cumulative number being a number of packets of the program information set that should be transmitted by an end of the "n"th transmission period; and
a selecting unit operable to, if a number of hitherto fetched packets of the program information set is at least equal to the cumulative number, select another program information set assigned a next higher priority as a program information set whose packets are to be fetched.

13. A program information transmission apparatus that repeatedly transmits program information with a predetermined cycle, comprising:
a storing unit operable to store information showing a transmission amount per unit time, the unit time being shorter than the cycle;
a fetching unit operable to fetch the program information in parts so that each fetched part of the program information has a size within the transmission amount per unit time; and
a transmission unit operable to sequentially transmit each fetched pat of the program information,
wherein the information in the storing unit shows, as the transmission amount per unit time, a maximum number of packets that should be transmitted per unit time,
the fetching unit includes:
a packet generating unit operable to generate a plurality of packets of a fixed length from program information sets, each of which includes a part of the program information;
a holding unit operable to hold the plurality of packets so that packets belonging to different program information sets are held in different queues; and
a packet fetching unit operable to fetch the plurality of packets from the queues in a predetermined order so that a number of packets fetched per unit time does not exceed the maximum number,
packets generated from one prgram information set is divided into at least one section, and
the packet fetching unit is controlled to fetch all packets in a current section before fetching packets in another section, and
the program information transmission apparatus further comprising:
a input receiving unit operable to receive an input of immediate program information that should be urgently transmitted;
a prohibiting unit operable to prohibit, if immediate program information is inputted, the packet fetching unit from fetching packets;
a second packet generating unit operable to generate a plurality of packets of a fixed length from the inputted immediate program information;
a transmission control unit operable to control the transmission unit to sequentially transmit all of the packets generated by the second packet generating unit; and
a prohibition ending unit operable to instruct, after all of the packets generated by the second packet generating unit are transmitted, the prohibiting unit to end the prohibition operation.

14. The program information transmission apparatus of claim 13,
wherein the prohibiting unit waits for all packets of a section, which includes a packet fetched immediately before the immediate program information was inputted, to be fetched before starting the prohibition operation.

15. A program information transmission apparatus that repeatedly transmits program information with a predetermined cycle, comprising:
a storing unit operable to store information showing a transmission amount per unit time, the unit time being shorter than the cycle;
a fetching unit operable to fetch the program information in parts so that each fetched part of the program information has a size within the transmission amount per unit time; and
a transmission unit operable to sequentially transmit each fetched put of the program information,
wherein the information in the storing unit shows, as the transmission amount per unit time, a maximum number of packets that should be transmitted per unit time, and
the fetching unit includes:
a packet generating unit operable to generate a plurality of packets of a fixed length from program information sets, each of which includes a part of the program information;
a holding unit operable to hold the plurality of packets so that packets belonging to different program information sets are held in different queues; and
a packet fetching unit operable to fetch the plurality of packets from the queues in a predetermined order so that a number of packets fetched per unit time does not exceed the maximum number, and
the program information transmission apparatus further comprising:
an input receiving unit operable to receive an input of immediate program information that should be urgently transmitted;
a prohibiting unit operable to prohibit, if immediate program information is inputted, the packet fetching unit from fetching packets;

a second packet generating unit operable to generate a plurality of packets of a fixed length from the inputted immediate program information;

a transmission control unit operable to control the transmission unit to sequentially transmit all of the packets generated by the second packet generating unit; and a prohibition ending unit operable to perform, after all of the packets generated by the second packet generating unit are transmitted, packet transmission adjustment for a number of transmitted packets exceeding the maximum number of packets that should be transmitted per unit time, before instructing the prohibiting unit to end the prohibition operation.

16. The program information transmission apparatus of claim 15,
wherein the prohibiting unit waits for all packets of a section, which includes a packet fetched immediately before the immediate program information was inputted, to be fetched before starting the prohibition operation, and the prohibition ending unit waits for a number of packets, whose transmission is refrained after all packets generated by the second packet generating unit are transmitted, reaches a number of transmitted packets exceeding the maximum number of packets that should be transmitted per unit time, before instructing the prohibiting unit to end the prohibition operation.

17. A program information transmission method of repeatedly transmitting program information with a predetermined cycle, comprising:

a packet generating step for generating a plurality of packets of a fixed length from program information sets, each of which includes a part of the program information;

a holding step for holding the plurality of packets so that packets belonging to different program information sets are held in different queues;

a packet fetching step for fetching, in each transmission period that is a period within the cycle and has a length of a unit time shorter than the cycle, the plurality of packets from the queues in a predetermined order so that a number of packets fetched in each transmission period does not exceed a maximum number of packets that should be transmitted in the transmission period; and a transmission step for sequentially transmitting each fetched packet, wherein packets generated from one program information set is divided into at least one section, the packet fetching step is controlled to fetch all packets in a current section before fetching packets in another section, each program information set is assigned a priority, the packet fetching step fetches the plurality of packets from the queues according to the priorities assigned to the program information sets, and the packet fetching step includes:

a cumulative calculation step for calculating, after the packet fetching step fetches the last packet of a current section in an "n"th transmission period, a cumulative number for a program information set including the current section by multiplying "n" by a predetermined maximum number of packets of the program information set that should be transmitted per unit time, the cumulative number being a number of packets of the program information set that should be transmitted by an end of the "n"th transmission period;

a calculation step for recalculating each maximum number, each time at least one program information set is updated or is newly registered, wherein the calculation step includes:

a first calculation step for dividing a data amount of each program information set by a number of transmission periods within the cycle and set a division result obtained for each program information set as an average number for the program information set without rounding up or discarding a fractional portion of the division result, each average number for one program information set being a number of packets of the program information set that should be transmitted per unit time;

a second calculation step for calculating, for each program information set, a cumulative number of packets of the program information set that should be transmitted by an end of an "n"th transmission period by multiplying the average number for the program information set by "n";

a third calculation step for totaling the cumulative number calculated in the second calculation step; and a fourth calculation step for calculating the maximum number for the "n"th transmission period from the total calculated in the third calculalion step, and the information in the storing step is overwritten with the maximum number calculated in the fourth calculation step.

18. A method of repeatedly transmitting program information with a predetermined cycle, comprising the steps of:

storing information showing a maximum number for each transmission period that is a period within the cycle and has a length of a unit time shorter than the cycle, each maximum number for one transmission period being a number of packets that should be transmitted in the transmission period;

generating a plurality of packets of a fixed length from program information sets, each of which includes a part of the program information;

holding the plurality of packets so that packets belonging to different program information sets are held in different queues;

fetching the plurality of packets from the queues in a predetermined order so that a number of packets fetched in each transmission period does not exceed the maximum number for the transmission period;

sequentially transmitting each fetched packet; and recalculating each maximum number, each time at least one program information set is updated or is newly registered, wherein the recalculating steps includes:

dividing a data amount of each program information set by a number of transmission periods within the cycle and setting a division result obtained for each program information set as an average number for the program information set without rounding up or discarding a fractional portion of the division result, each average number for one program information set being a number of packets of the program information set that should be transmitted per unit time;

recalculating, for each program information set, a cumulative number of packets of the program information set that should be transmitted by an end of an "n"th transmission period by multiplying the average number for the program information set by "n";

totaling the cumulative numbers recalculated; and calculating the maximum number for the "n"th transmission period from the total cumulative number calculated, wherein the information stored is overwritten with the maximum number calculated for the "n"th transmission period.

* * * * *

UNITED STATES PATENT AND TRADEMARK OFFICE
CERTIFICATE OF CORRECTION

PATENT NO. : 7,065,097 B2
APPLICATION NO. : 09/748479
DATED : June 20, 2006
INVENTOR(S) : Kumazaki et al.

Page 1 of 1

It is certified that error appears in the above-identified patent and that said Letters Patent is hereby corrected as shown below:

In the Claims:
In Claim 6, Column 25, line 54 "-to" should be --to--.
In Claim 12, Column 27, line 31 "a" should be --"n"--.
In Claim 15, Column 28, line 44, "put" should be --part--.

Signed and Sealed this

Third Day of April, 2007

JON W. DUDAS
*Director of the United States Patent and Trademark Office*